(12) United States Patent
Tamaru

(10) Patent No.: US 7,012,708 B2
(45) Date of Patent: Mar. 14, 2006

(54) INTERNET FACSIMILE APPARATUS AND INTERNET FACSIMILE COMMUNICATION METHOD

(75) Inventor: Tatsuya Tamaru, Utsunomiya (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 975 days.

(21) Appl. No.: 09/818,829

(22) Filed: Mar. 28, 2001

(65) Prior Publication Data

US 2002/0015178 A1      Feb. 7, 2002

(30) Foreign Application Priority Data

Apr. 3, 2000    (JP)    .............................. 2000-100998

(51) Int. Cl.
  G06F 15/00  (2006.01)
  G06F 15/16  (2006.01)
  H04N 1/00   (2006.01)
  H04M 11/00  (2006.01)
  H04M 1/64   (2006.01)

(52) U.S. Cl. ...................... 358/1.15; 358/1.1; 358/403; 379/100.01; 379/88.12; 379/88.17; 709/206

(58) Field of Classification Search .............. 358/1.15, 358/1.1, 403, 440, 400; 379/93.24, 90.01, 379/93.01, 93.17, 100.01, 88.17, 88.12, 100.08; 709/206

See application file for complete search history.

(56) References Cited

U.S. PATENT DOCUMENTS 5,881,233 A    3/1999  Toyoda et al.
6,374,291 B1 *  4/2002  Ishibashi et al. ............ 709/206
6,825,955 B1 * 11/2004  Shibata ........................ 358/402

FOREIGN PATENT DOCUMENTS

| JP | 8-242326    | 9/1996  |
| JP | 9-325924    | 12/1997 |
| JP | 10-190879   | 7/1998  |
| JP | 2000 -78346 | 3/2000  |
| JP | 2000-299745 | 10/2000 |

OTHER PUBLICATIONS

English Language Abstract of JP 2000-299745.
English Language Abstract of JP 2000-78346.
English Language Abstract of JP 9-325924.
English Language Abstract of JP 10-190879.

* cited by examiner

*Primary Examiner*—Kimberly Williams
*Assistant Examiner*—Thomas J Lett
(74) *Attorney, Agent, or Firm*—Greenblum & Bernstein, P.L.C.

(57) ABSTRACT

An IFAX on a transmitting end gains access to an ISP on the transmitting end by dialup. The IFAX on the transmitting end transmits mail transmission notice to an IFAX on a receiving end via a PSTN after transmitting e-mail to the ISP on the transmitting end. Thereafter, the IFAX on the receiving end gains access to an ISP on the receiving end by dialup in accordance with mail transmission notice and receives e-mail stored in its own postbox. The mail transmission notice is performed using a facsimile communication protocol. The mail transmission notice includes at least one of transmission finished notice information, sent data information, and receiving information. This eliminates the unavailing mail check connection and reduces access charge at a dialup IFAX of the Internet facsimile.

6 Claims, 19 Drawing Sheets

INTERNET FACSIMILE APPARATUS AND INTERNET FACSIMILE COMMUNICATION METHOD

BACKGROUND OF THE INVENTION

1. Field of the Invention

The present invention relates to an Internet facsimile apparatus and an Internet facsimile communication method.

2. Description of the Related Art

Conventionally, there is developed an Internet facsimile apparatus (hereinafter referred to as IFAX) as disclosed in, for example, Japanese Published Unexamined Patent Application HEI 8-242326 and corresponding U.S. Pat. No. 5,881,233. As one of method for connecting IFAX to the Internet, there is dial-up connection. IFAX connected to the Internet by dialup (hereinafter referred to as dial-up IFAX) generally uses a mail server that is provided by an Internet service provider (hereinafter referred to as ISP).

The conventional dial-up IFAX gains access to an access point of ISP by dial-up and access to the mail server to confirm the presence or absence of incoming mail stored in the mail server. This operation is called a mail check connection. Since the dial-up IFAX must connect to the ISP even if incoming mail is not stored in the mail server, the unavailing mail check connection easily occurs. As a result, a telephone charge for dial-up access and an ISP service charge (hereinafter referred to as an access charge) are wasted.

There is a case where data format of image information attached to incoming mail cannot be printed by the dial-up IFAX even if incoming mail is stored in the mail server. In this case, since no printing can be carried out, the access charge is wasted even if the mail check connection is performed to receive incoming mail.

Moreover, in the case of divisionally transmitting an original from a transmitting end, the dial-up IFAX on a receiving end sometimes performs the mail check connection and receives e-mail before all e-mail reaches the mail server of ISP. In this case, there is a problem in which only the part of the originals is printed. All originals can be printed in a single step if all e-mail is prepared and received one time. In this case, the access charge is also wasted.

SUMMARY OF THE INVENTION

It is an object of the present invention is to provide an Internet facsimile apparatus and an Internet facsimile communication method that is capable of eliminating the unavailing mail check connection at a dial-up IFAX to reduce access charge.

In order to accomplish the above object, according to the present invention, in transmitting e-mail to a receiving apparatus that receives e-mail from the Internet after establishing the connection to the Internet by use of access by dial-up, the following operation is carried out. More specifically, when a transmitting apparatus transmits e-mail to the Internet, the transmitting apparatus notifies the receiving apparatus of the fact that e-mail has been transmitted and information relating to send data included in e-mail via the telephone network. The receiving apparatus determines whether send data is receivable based on information relating to send data. Then, when send data is receivable, access to the Internet by dial-up is carried out to receive e-mail from the Internet.

The receiving apparatus is connected to the access point of ISP only when send data is normally received and printing can be performed, and this makes it possible to largely reduce the waste of connection charge.

Moreover, according to the present invention, in order to attain the above object, in transmitting e-mail to a receiving apparatus that receives e-mail from the Internet after establishing the connection to the Internet by use of access by dial-up, the following operation is carried out. More specifically, when a transmitting apparatus transmits e-mail to the Internet, the transmitting apparatus notifies the receiving apparatus of the fact that e-mail has been transmitted and information relating to timing at which e-mail is received from the Internet. The receiving apparatus is connected to the Internet by use of access by dial-up in accordance with information of this reception timing, and receives this e-mail from the Internet.

Since the receiving apparatus is connected to the ISP at timing that the transmitting apparatus desires, for example, reception is delayed until all originals are transmitted, making it possible to decrease the number of accesses by dial-up and to largely reduce the waste of connection charge.

Still moreover, according to the present invention, in order to accomplish the above object, in transmitting e-mail to a receiving apparatus that receives e-mail from the Internet after establishing the connection to the Internet by use of access by dial-up, the following operation is carried out. More specifically, when e-mail is transmitted to the Internet, a transmitting apparatus is connected to the receiving apparatus via the telephone network, and transmits a given signal indicative of the fact that e-mail has been transmitted using a transmission terminal identification signal in facsimile protocol in place of an identification number used in normal facsimile communication. The receiving apparatus recognizes the identification signal from the transmission terminal identification signal received from the transmitting apparatus, and compares this identification signal with a given number. When both are matched each other, the receiving apparatus is connected to the Internet by use of access by dial-up, and receives this e-mail from the Internet.

Accordingly, it is possible to perform notice of e-mail transmission from the transmitting apparatus extremely easily using the existing facsimile control means. Also, it is possible to rationalize the number of accesses by dial-up and to largely reduce the waste of connection charge.

Still moreover, according to the present invention, in order to attain the above object, in transmitting e-mail to a receiving apparatus that receives e-mail from the Internet after establishing the connection to the Internet by use of access by dial-up, the following operation is carried out. More specifically, when e-mail is transmitted to the Internet, a transmitting apparatus calls a telephone number of the receiving apparatus and an exchange performs caller number notice to the receiver in response to this call, and then stops the calling. The receiving apparatus receives the caller number notice and recognizes the caller number, and compares this caller number with a mail sender number preregistered. When both are matched each other, the receiving apparatus is connected to the Internet by use of access by dial-up, and receives this e-mail from the Internet.

The receiving apparatus is connected to the Internet by use of access by dial-up and receives this e-mail from the Internet when receiving a call from a predetermined party. This also makes it possible to decrease the number of accesses by dial-up and to largely reduce the waste of connection charge. In addition, since the transmitting apparatus originates only a call to the receiving apparatus, thereby making it possible to notify the receiving apparatus that e-mail has been transmitted, the charge for a telephone call may not occur.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

Preferred embodiments of the present invention will be specifically described with reference to the drawings accompanying herewith.

(First Embodiment)

Figure 1:
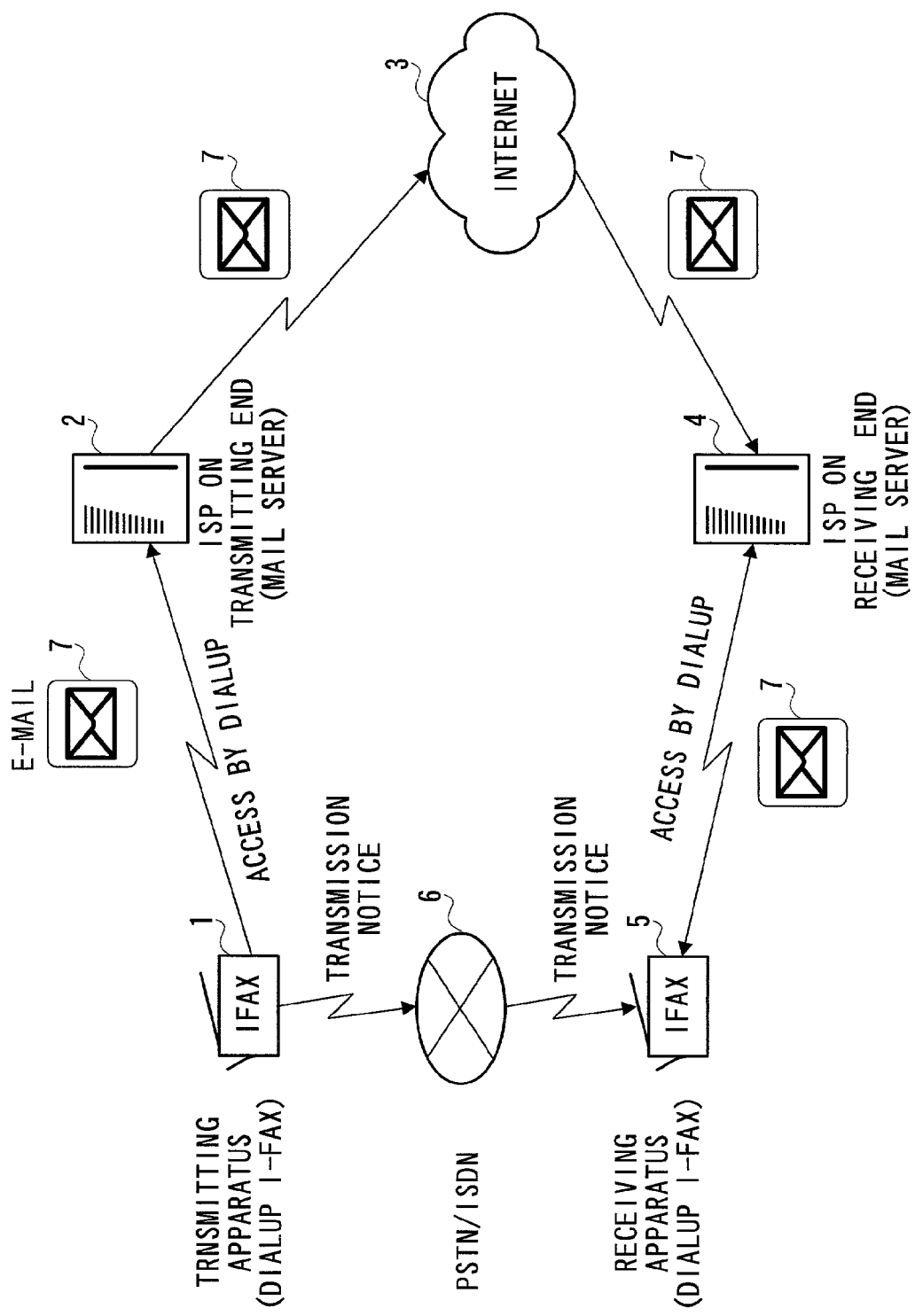
FIG. 1 is a conceptual view illustrating a network system in which an Internet facsimile apparatus relating to a first embodiment of the present invention.

FIG. 1 is a conceptual view illustrating a network system in which an Internet facsimile apparatus relating to a first embodiment of the present invention.

IFAX 1 on a transmitting end gains access to an ISP 2 on the transmitting end by dial-up to be connected to the Internet 3. The ISP 2 comprises a mail server function. IFAX 1 on the transmitting end transmits e-mail 7 to the ISP 2 on the transmitting end. The ISP 2 on the transmitting end is connected to an ISP 4 on a receiving end. The ISP 4 on the receiving end also comprises a mail server function, and has a post box for a receiving end. The ISP on the transmitting end transfers e-mail 7 to the ISP 4 on the receiving end, and the ISP 4 on the receiving end stores e-mail 7 to the post box on the receiving end.

IFAX 1 on the transmitting end transmits e-mail to the ISP 2 on the transmitting end, and then sends mail transmission notice to IFAX 5 on the receiving end via a public switched telephone network (PSTN)/an integrated services digital network (ISDN) 6.

Thereafter, the IFAX 5 on the receiving end gains access to this ISP 4 on the receiving end by dial-up, and receives e-mail 7 stored in its own post box. The IFAX 5 on the receiving end prints the content of received e-mail on recording paper similar to normal facsimile.

The mail transmission notice is carried out using the facsimile communications protocol, which is the existing communication protocol used via PSTN/ISDN.

Figure 2:
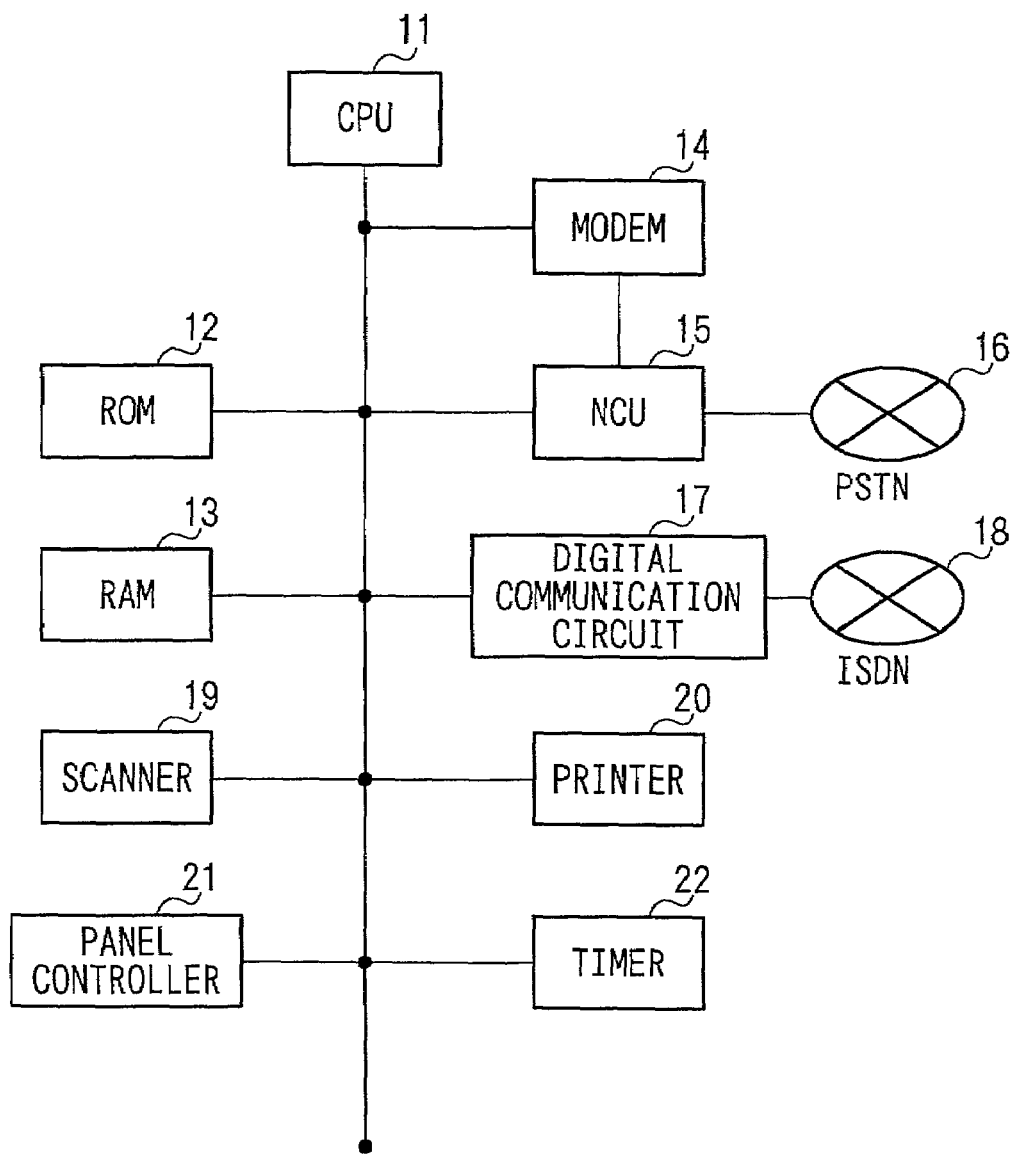
FIG. 2 is a block diagram illustrating hardware of the Internet facsimile apparatus relating to the first embodiment of the present invention.

An explanation will be next given of a hardware configuration of IFAXes 1 and 5 on the transmitting end and the receiving end. FIG. 2 is a block diagram illustrating hardware of the Internet facsimile apparatus relating to the first embodiment.

A CPU 11 executes a program and controls the entirety of apparatus. A ROM 12 stores the program that is executed by the CPU 11.

A RAM 13 has a working area where the program is executed a buffer area where various kinds of data such as e-mail and image files and the like are temporarily stored.

A modem 14 modulates and demodulates received/transmitted data, and has a FAX modem function and a data modem function. An NCU (Network Control Unit) 15 performs closing and breaking of a PSTN 16 and has a function of detecting transmission and reception of dial pulses corresponding to a facsimile number of a communication partner.

A digital communication circuit 17 is connected to an ISDN 18, converts transmitted data as a digital signal to a voltage fluctuation, and transmits it on the ISDN 18. The digital communication circuit 17 also converts the voltage fluctuation on the ISDN 18 to the digital signal as received data.

A scanner 19 scans an original to obtain image information. A printer 20 prints various data including received image information.

A panel controller 21 comprises dial keys and a touch panel, and is subjected to operations done by an operator such as a designation of destination partner, an instruction of starting transmission, and so on. A timer 22 is provided to measure time.

Figure 3:
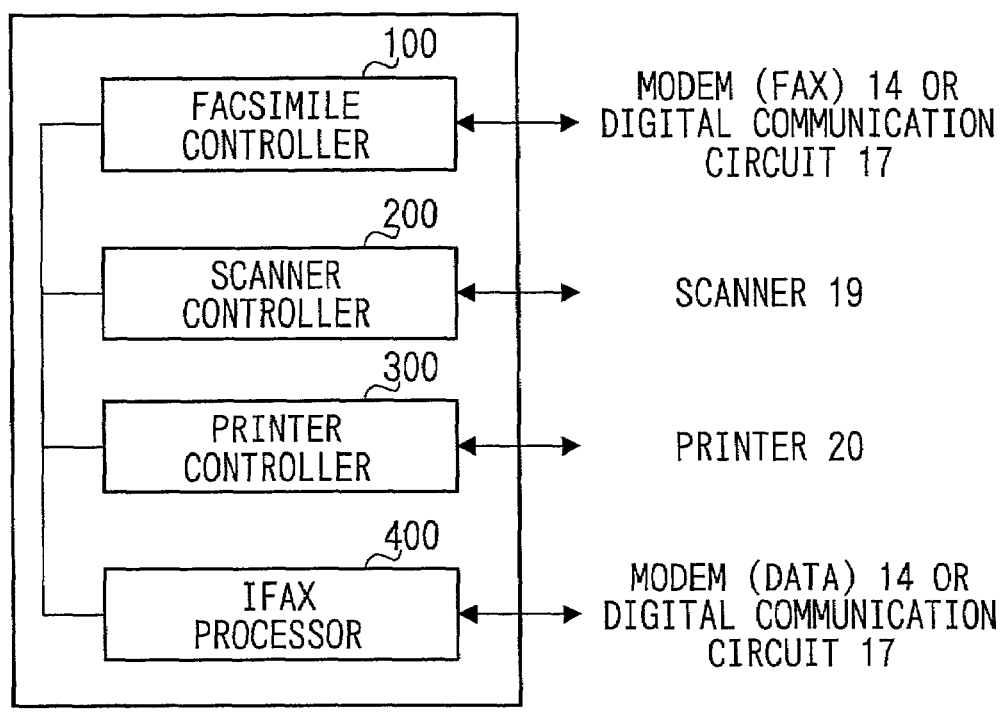
FIG. 3 is a block diagram illustrating a capability of the Internet facsimile apparatus relating to the first embodiment of the present invention.

A ROM 12 stores a program, and the CPU 11 executes the program. The function, which is resultantly implemented, will be described below. FIG. 3 is a block diagram illustrating the IFAXes 1 and 5.

IFAX 1 comprises a facsimile controller 100, a scanner controller 200, and a printer controller 300, and controls each processor of the modem 14, the digital communication circuit 17, the scanner 19, and the printer 20.

IFAXes 1 and 5 comprise an IFAX processor 400 that implements the capability as IFAX. This IFAX processor 400 is connected to the ISPs 2 and 4 using the modem 14 or the digital communication circuit 17, and transmits/receives e-mail over the Internet. Namely, the IFAX processor 400 attaches image information scanned by the scanner 19 to e-mail, and transmits it to the transmission destination via mail servers provided by the ISPs 2 and 4. The transmission destination prints the content of e-mail (including text body and image information) by the printer 20 when receiving e-mail.

Figure 4:
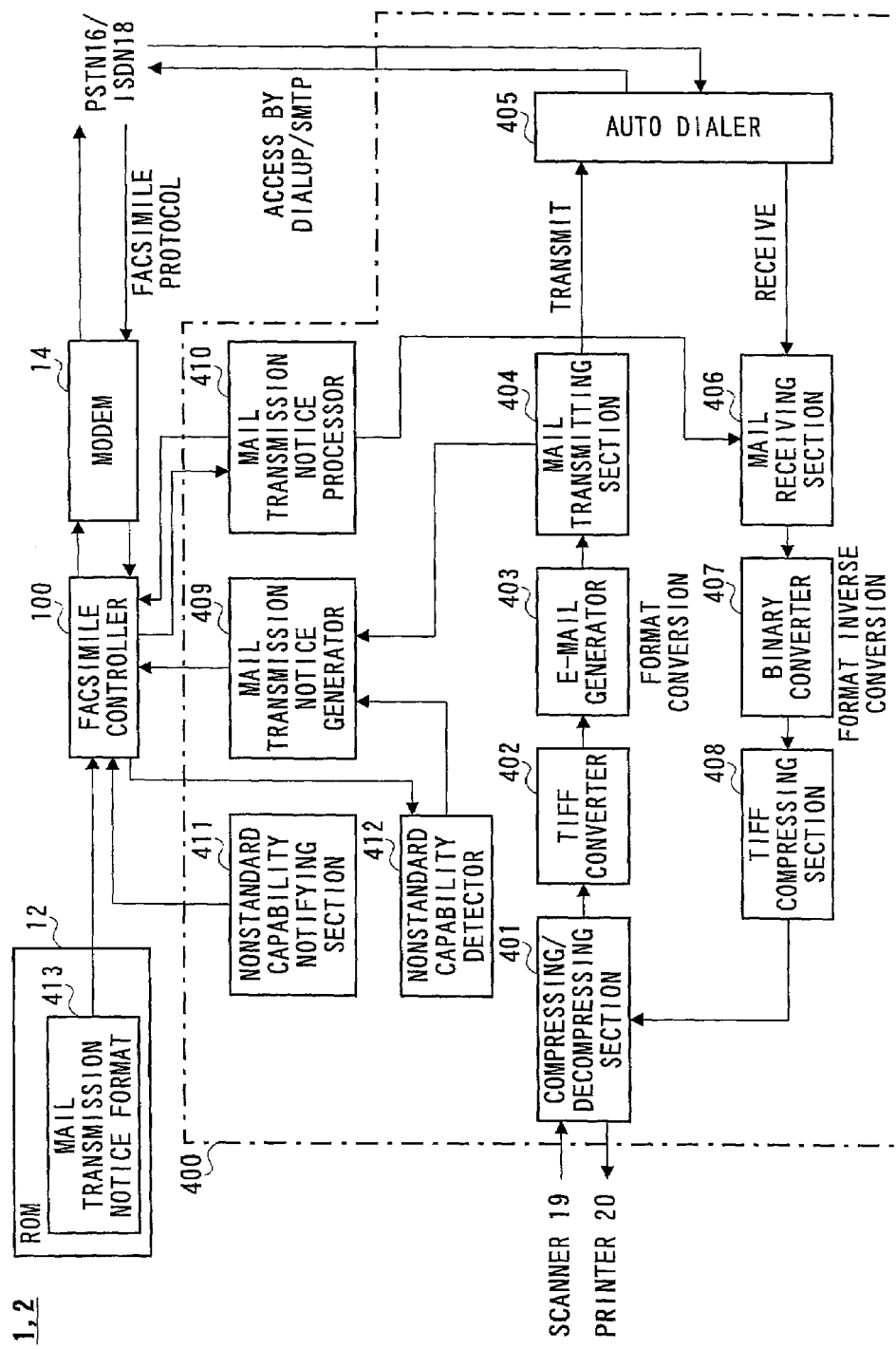
FIG. 4 is a block diagram illustrating an IFAX processor of the Internet facsimile apparatus relating to the first embodiment of the present invention.

FIG. 4 is a block diagram illustrating an IFAX processor of the Internet facsimile apparatus relating to the first embodiment.

The scanner controller 200 illustrated by FIG. 3 sends raw image data (for example, bit map data) scanned by the scanner 19 to the IFAX processor 400. In the IFAX processor 400, a compressing/decompressing section 401 compresses row image data in compression format such as MH, MR, MMR, and the like, and obtains compressed files. The compression is carried out on a one page original basis. A TIFF converter 402 converts these compressed files to one TIFF (Tagged Image File Format) file.

An e-mail generator 403 generates e-mail directed to a destination mail address designated by the panel controller 21. More specifically, the mail generator 403 puts this destination mail address into a destination filed [To:] of a header of e-mail. The mail generator 403 attaches the TIFF file from the TIFF converter 403 to an e-mail attaching data section in accordance with, for example, MIME (Multipurpose Internet Mail Extensions), and generates e-mail. The IFAX processor 400 also converts facsimile data received at the facsimile controller 100 to e-mail. In other words, the IFAX processor 400 converts the compressed files received as facsimile data to the TIFF file, attaches the TIFF file to e-mail, and generates e-mail.

The generated e-mail is transferred to the mail server of the ISP 2 on the transmitting end. At this time, a mail transmitting section 404 instructs an auto dialer 405 to gain access to the ISPs 2 and 4 by dial-up. The auto dialer 405 generates a call to the telephone numbers of ISPs 2 and 4 by the modem 14 or the digital communication circuit 17. When a line connection between the ISPs 2 and 4 is established, the mail transmitting section 404 logs on the Internet 3 by a given procedure. After logging on, the mail transmitting section 404 transfers e-mail to the mail servers of the ISPs 2 and 4 in accordance with a mail transfer protocol such as SMTP. After transferring, the auto dialer 405 logs off the Internet by a predetermined procedure, and opens the line.

In the IFAX processor 400, a mail receiving section 406 instructs the auto dialer 405 to gain access to the ISPs 2 and 4 by dial-up periodically (automatically) or based on the instruction from the user (manually). After the auto dialer 405 logs on the Internet, the mail receiving section 406 receives e-mail from the mail servers of the ISPs 2 and 4 in accordance with a mail transfer protocol such as POP 3. After the end of reception, the auto dialer 405 logs off the Internet 3, and opens the line.

After receiving e-mail, a binary converter 407 converts an attachment file included in e-mail from a text code to obtain a TIFF file. A TIFF compressing section 408 compresses the obtained TIFF file to obtain a compressed file. The compressing/decompressing section 401 decompresses the compressed file to obtain raw image data. The printer 20 prints this raw image data.

After the mail transmitting section 404 transmits e-mail, the IFAXes 1 and 5 performs a notice of mail transmission against the receiving end over the telephone network (PSTN 16/ISDN 18) in accordance with the facsimile protocol. For this reason, the IFAX controller 400 of each of IFAXes 1 and 5 comprises a mail transmission notice generator 409 and a mail transmission notice processor 410. For convenience of explanation, the following explanation is given on the assumption that the IFAX 1 on the transmitting end transmits a notice of mail transmission and the IFAX 5 on the receiving end receives the mail transmission notice. The IFAXes 1 and 5 may, of course, have the same configuration or the different configuration.

The mail transmission notice generator 409 generates mail transmission notice notifying that the mail transmitting section 404 has transmitted e-mail to the receiving end. This mail transmission notice includes at least one of information indicating that mail has been transmitted (hereinafter referred to as transmitted notice information), information relating to transmitted data included in mail (hereinafter referred to as sent data information) and information (hereinafter referred to as message receiving information) relating to mail reception from mail sever done by the receiving end, i.e., message receiving from the mail server.

Sent data information herein includes file formats (for example, TIFF, BMP (bitmap), JPEG, JBIG, and so on) of the image file included in the transmitted e-mail, compressed formats (bitmap, JPEG, JBIG, MH, MR, MMR, and so on), the number of colors of image data, the number of originals, a memory capacity of image information, transmitter (sender) information, and the like.

Message receiving information includes, for example, designation of mail receiving time, a lapse of time between the notice of mail transmission and the mail reception, or delay of receiving mail until the mail transmission notice of the final transmission is received when a plurality of originals is divisionally transmitted some times.

The mail transmission notice generator 409 sends the generated mail transmission notice to the facsimile controller 100. The facsimile controller 100 transmits the respective information of the aforementioned mail transmission notice to the IFAX 5 on the receiving end in accordance with the facsimile protocol. More specifically, after the mail transmitting section 404 ends mail transmission processing, the mail transmission notice generator 409 generates the respective information of the mail transmission notice. After that, the mail transmission notice generator 409 causes the modem 14 or the digital communication circuit 17 to call the facsimile number of IFAX 5 on the receiving end under control of the facsimile controller 100, whereby establishing the line connection between the IFAX 1 on the transmitting end and the IFAX 5 on the receiving end. Next, the facsimile controller 100 of the IFX 1 on the transmitting end executes facsimile communications with the facsimile controller 100 of the IFAX 5 on the receiving end. The facsimile communications are made of a call setting (phase A), facsimile protocol (phases B, C, D), and a call recovery (phase E). The facsimile controller 100 on the transmitting end presents the respective information of mail transmission notice to the receiving end in a facsimile control signal transmitted to the receiving end in any phase. In facsimile communications, substantial image signals are not necessarily transmitted. In the first embodiment, the respective information of mail transmission notice is included in the facsimile control signal of the facsimile protocol.

A mail transmission notice processor 410 of the IFAX 5 on the receiving end identifies the respective information of mail transmissio n notice included in the facsimile control signal, and controls the mail receiving section 406 to execute the reception of e-mail based on the identified information.

First, the mail transmission notice processor 410 determines whether or not an image file attached to e-mail is receivable from sent data information by the IFAX 5 itself. More specifically, the mail transmission notice processor 410 determines the followings or the like:

(1) whether or not file format of the image file is allowable by the IFAX 5 itself;

(2) whether or not compressed format of the image file is decompressible by the IFAX 5 itself (whether or not image data coding format is decodable by the IFAX 5 itself);

(3) whether or not the number of colors of image data and resolution are allowed to be output by the IFAX 5 itself;

(4) whether or not the capacity of transmitted data exceeds that of the reception memory of the IFAX 5 itself; and (5) whether or not the number of originals exceeds the residual of the printing paper of the IFAX 5 itself.

Namely, the point that the image file is receivable by the IFAX 5 itself is that attachment file data of e-mail can be effectively handled. When it is determined that the image file is not receivable, access by dial-up is skipped, making it possible to eliminate wasteful access by dial-up.

Secondly, the mail transmission notice processor 410 controls the reception of e-mail at the mail receiving section 406 from the mail server of the ISP 4 on the receiving end in accordance with message receiving information. For example, the mail transfer processor 410 executes control such as the followings:

(1) if e-mail receiving time (year, month, day, time and the like) is specified by message receiving information, the mail transmission notice processor 410 causes the mail receiving section 406 to receive e-mail at specified time, (2) when standby time, which is from the notification of the mail transmission notice to the reception of mail, is specified by message receiving information, the mail transmission notice processor 410 causes the mail receiving section 406 to receive e-mail after passing specified standby time, and (3) when it is instructed that the reception of mail is delayed until the time comes when the final mail transmission notice will be received, the mail transmission notice processor 410 causes the mail receiving section 406 to receive all e-mail after receiving the final mail transmission notice.

Under such control, access by dial-up is carried out at suitable timing, which the transmitting end intends, whereby making it possible to eliminate wasteful access by dial-up.

According to the first embodiment, the mail transmission notice includes data format of transmission file attached to e-mail as sent data information, and standby time after the notice of the mail transmission as message receiving information in addition to information of transmission finished notice.

IFAXes 1 and 5 respectively have a nonstandard capability notifying section 411, which notifies a communication partner that IFAX has a capability of receiving mail transmission notice (hereinafter referred to as notice receiving function), and a nonstandard capability detector 412, which detects notice of the notice receiving function from the communication partner. The nonstandard capability notifying section 411 presents the notice receiving function to the receiving end in nonstandard terminal function signals (NSF). This presentation is carried out prior to the reception of the mail transmission notice. The nonstandard capability detector 412 causes mail transmission notice generator 409 to send mail transmission notice when detecting that the IFAX 5 on the receiving end has the notice receiving function. While, the nonstandard capability detector 412 sends a FAX document (hereinafter referred to as mail transmission notice) notifying the receiving end that transmission of mail has finished when detecting that the IFAX 5 on the receiving end has no notice receiving function. A format 413 of this FAX document is stored in the ROM 12.

The following will explain the flow in which the original is transmitted/received between the above-configured IFAXes 1 and 5 on the transmitting and receiving ends by use of e-mail.

First, an explanation is given of a case in which the mail transmission notice is sent using the nonstandard procedure according to the facsimile communication protocol.

Figure 5:
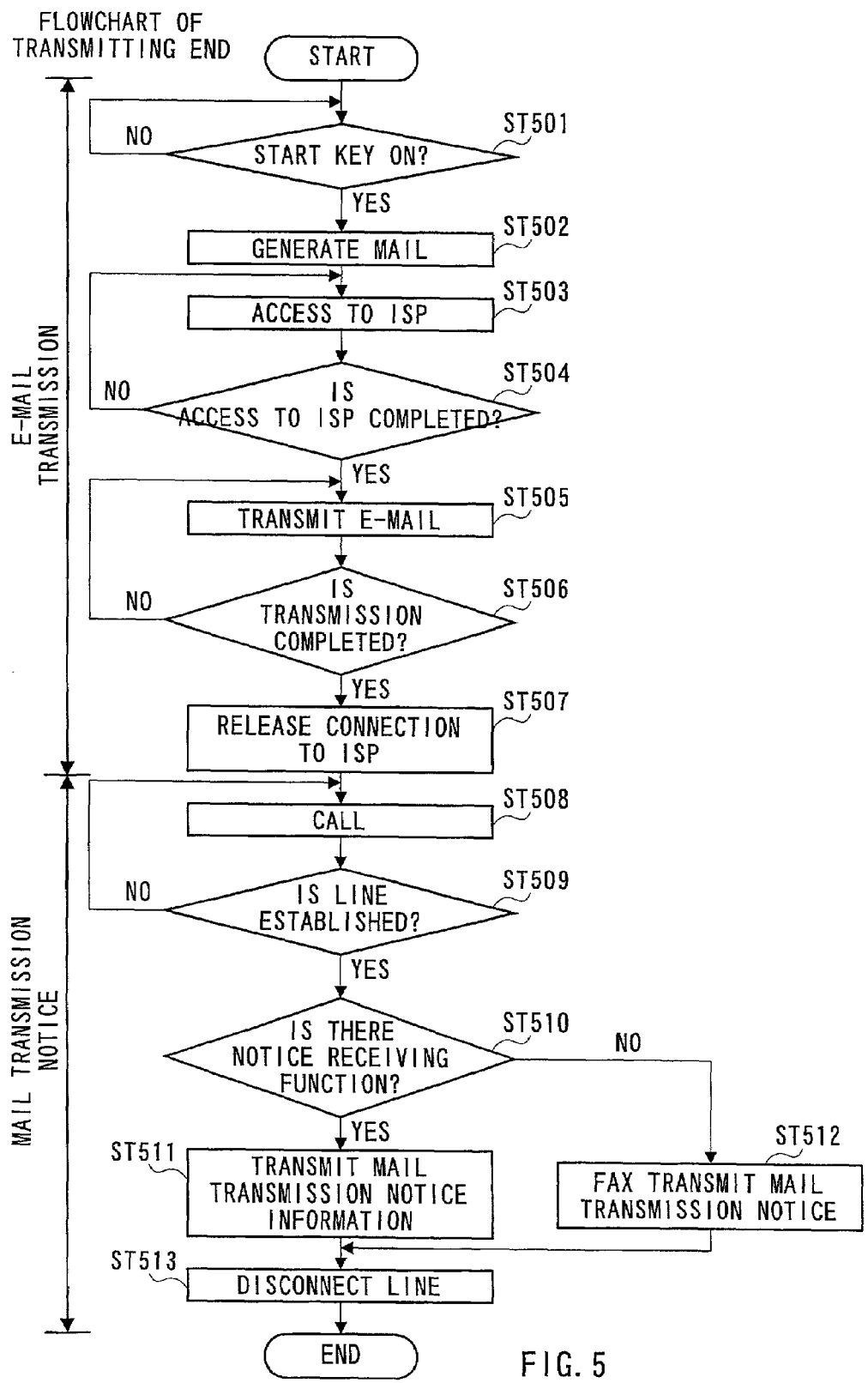
FIG. 5 is a flowchart illustrating an operation of the Internet facsimile apparatus on a transmitting end relating to the first embodiment of the present invention.
Figure 6:
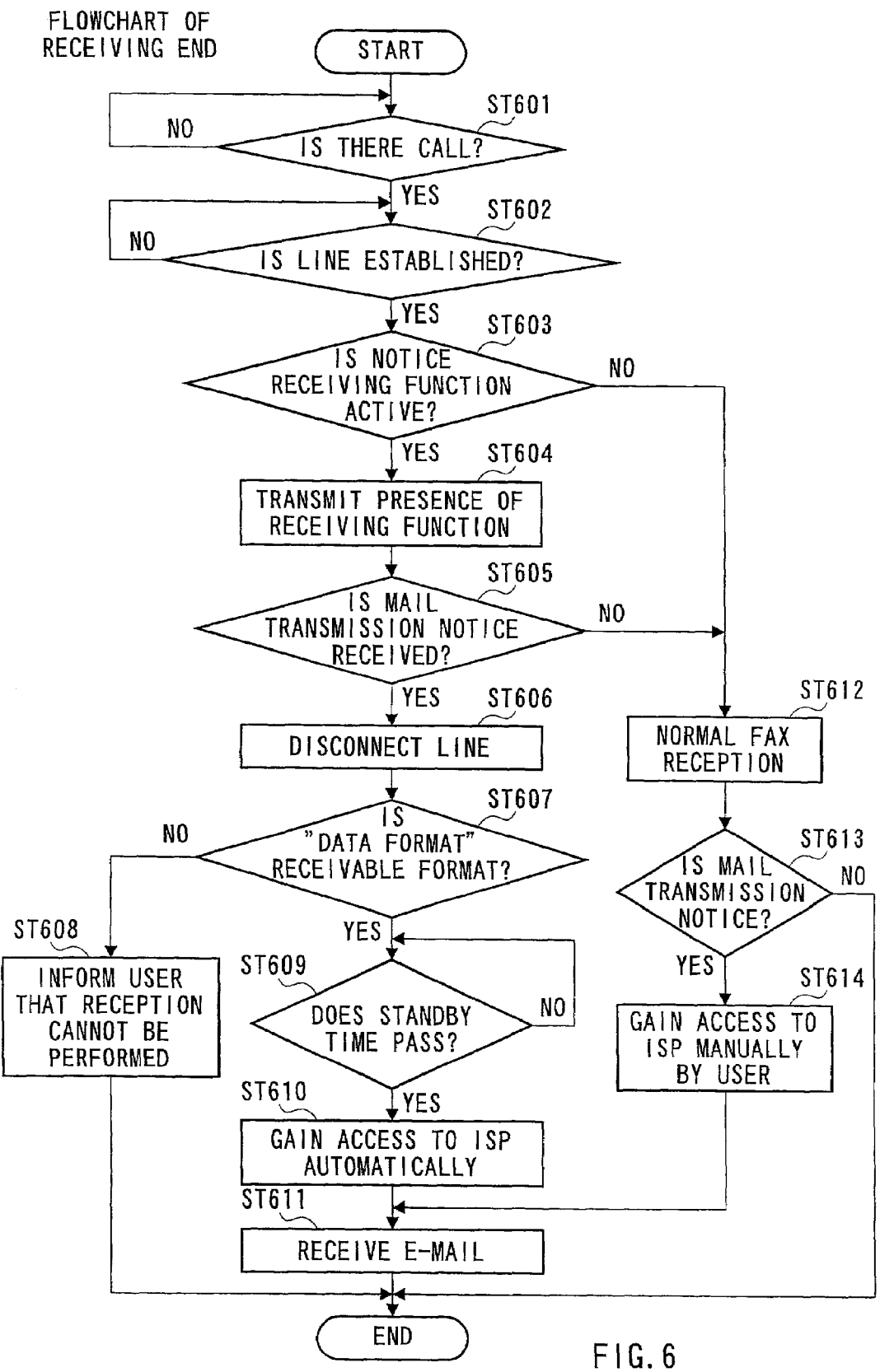
FIG. 6 is a flowchart illustrating an operation of the Internet facsimile apparatus on a receiving end relating to the first embodiment of the present invention.

FIG. 5 is a flowchart illustrating an operation of the Internet facsimile apparatus on the transmitting end relating to the first embodiment. FIG. 6 is a flowchart illustrating an operation of the Internet facsimile apparatus on the receiving end relating to the first embodiment.

First, as illustrated in FIG. 5, when a start key provided in the panel controller 21 of IFAX 1 is pressed (step (hereinafter referred to as ST) 501), the e-mail generator 403 of the IFAX processor 400 converts image information obtained by scanning the original to the TIFF file, and generates e-mail accompanied by this TIFF file (ST502).

When generating e-mail, the mail transmitting section 404 controls the auto dialer 405, and tries access to the ISP 2 on the transmission end by dial-up (ST503). When access to the ISP 2 on the transmission end is completed (ST504), the mail transmitting section 404 starts to transmit e-mail to the mail server of the ISP 2 on the transmitting end (ST505). After that, when the transmission of e-mail is completed (ST506), the mail transmitting section 404 releases the connection to the ISP 2 on the transmission end from the line, and opens the telephone line (ST507).

After the transmission of e-mail in ST501 to ST507 is completed, IFAX 1 performs mail transmission notice in facsimile communications. First, the facsimile controller 100 of IFAX 1 controls the modem 14 to close the telephone line and to call the facsimile number of IFAX 5 on the e-mail receiving end (ST508). After that, the facsimile controller 100 waits for the establishment of line connection (ST509).

As illustrated in FIG. 6, when there is a call from the IFAX 1 on the transmitting end (ST601), the IFAX 5 on the receiving end waits for the establishment of line connection (ST602). When the telephone line is established, the nonstandard capability notifying section 411 determines whether the notice receiving function is active or not (ST603). When the notice reception function is active, the nonstandard capability notifying section 411 transmits NSF indicative of "notice receiving function is present" to the IFAX 5 on the transmitting end (ST604).

Backing to FIG. 5, the nonstandard capability detector 412 determines whether information of "notice receiving function is present" is included in NSF or not (ST510). When information of "notice receiving function is present" is included in NSF, the mail transmission notice generator 409 generates the respective information of mail transmission notice, includes it to the facsimile control signal, and transmits it to the IFAX 5 on the receiving end (ST511). While, when information of "notice receiving function is present" is not included in NSF, the mail transmission notice generator 409 transmits the mail transmission notice as an image signal (ST511) After sending the mail transmission notice using the facsimile control signal or the image signal, the IFAX 1 on the transmitting end disconnects the IFAX 5 on the receiving end from the line (ST513).

The mail transmission notice processor 410 of the IFAX 5 on the receiving end determines whether the respective information is included or not in the facsimile control signal (ST605). When the mail transmission notice is included in the facsimile control signal, the mail transmission notice processor 410 causes the facsimile controller 100 to disconnect the IFAX 1 on the transmitting end from the line (ST606). Next, the mail transmission notice processor 410 determines whether or not the data format of the transmission file attached to e-mail is receivable by the IFAX 5 on the transmitting end based on the mail transmission notice (ST607). When the data format is one that is unreceivable by the IFAX 5, the mail transmission notice processor 410 informs the user that e-mail is unreceivable by use of, for example, a display and the like provided in the panel controller 21 (ST608), and ends processing without accessing by dial-up.

It is noted that the nonstandard capability notifying section 411 may include information of "notice receiving function is absent" in NSF.

On the other hand, when the data format of transmission file is one that is receivable by the IFAX 5, the mail transmission notice processor 410 measures standby time specified by the transmitting end by use of the timer 22 based on the mail transmission notice (ST609). When the standby time passes, the mail receiving section 406 causes the auto dialer 405 to automatically perform connection to the ISP 4 on the receiving end (ST610). After the completion of the connection, the mail receiving section 406 receives e-mail from the mail server of ISP 4 on the receiving end (ST611). Thereafter, the content of e-mail including image information is printed by the printer 20.

When the IFAX 5 on the receiving end has no notice receiving function and the respective information of the mail transmission notice is included in the facsimile control signal in ST603, the IFAX 5 on the receiving end performs a normal facsimile reception (ST612). The IFAX 5 determines whether the FAX document received here is the mail transmission notice or not (ST613). When it is the mail transmission notice, the mail receiving section 406 causes the auto dialer 405 to perform connection to the ISP 4 on the receiving end (ST614) After the completion of connection, the mail receiving section 406 receives e-mail from the mail server of the ISP 4 on the receiving end (ST611). Thereafter, the content of e-mail including image information is printed by the printer 20.

Figure 7:
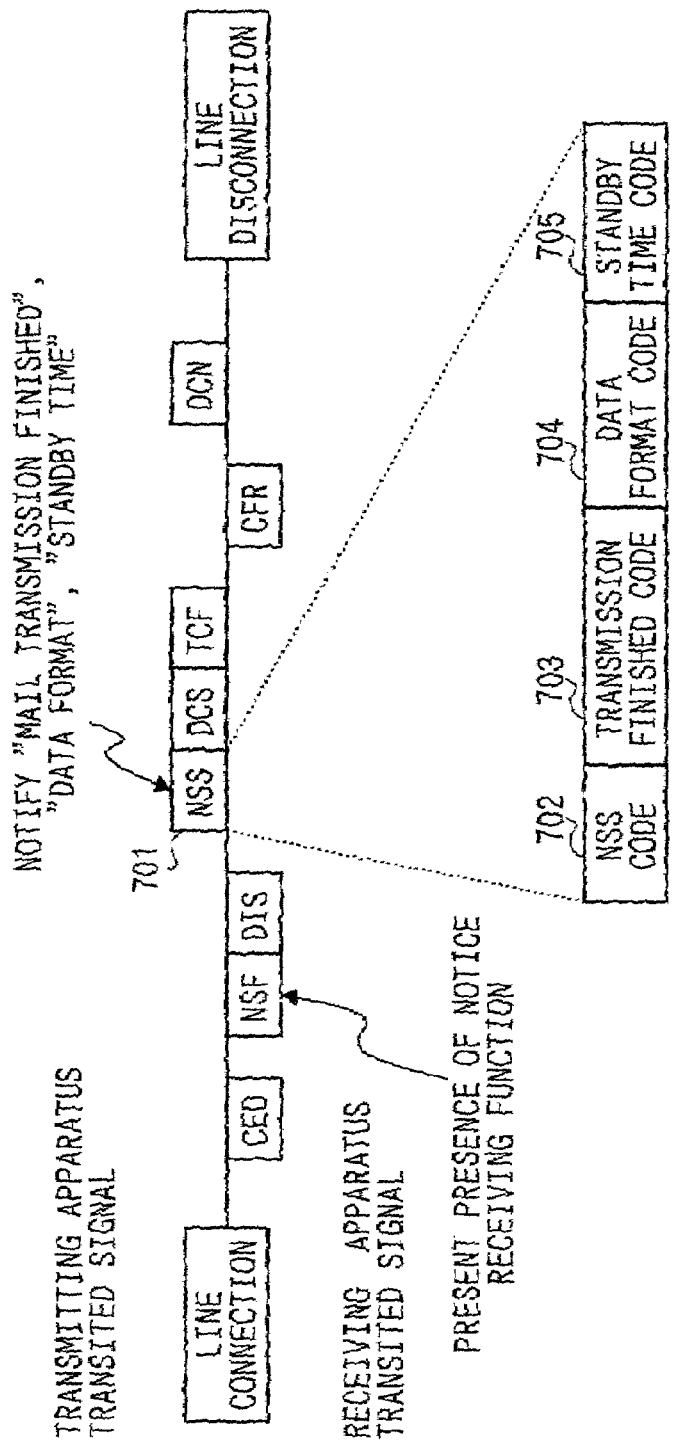
FIG. 7 is a view illustrating an example of nonstandard procedure including a notice of mail transmission according to the first embodiment.
Figure 8:
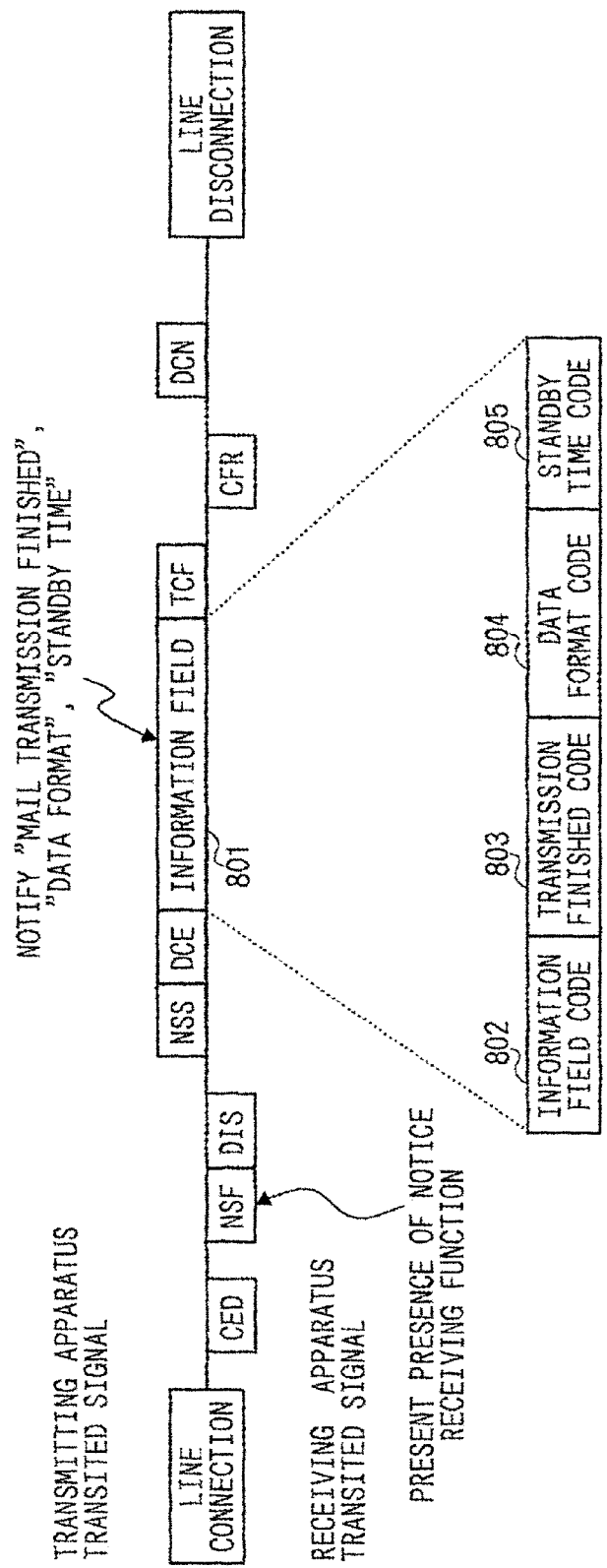
FIG. 8 is a view illustrating an example of nonstandard procedure including a notice of mail transmission according to the first embodiment.
Figure 9:
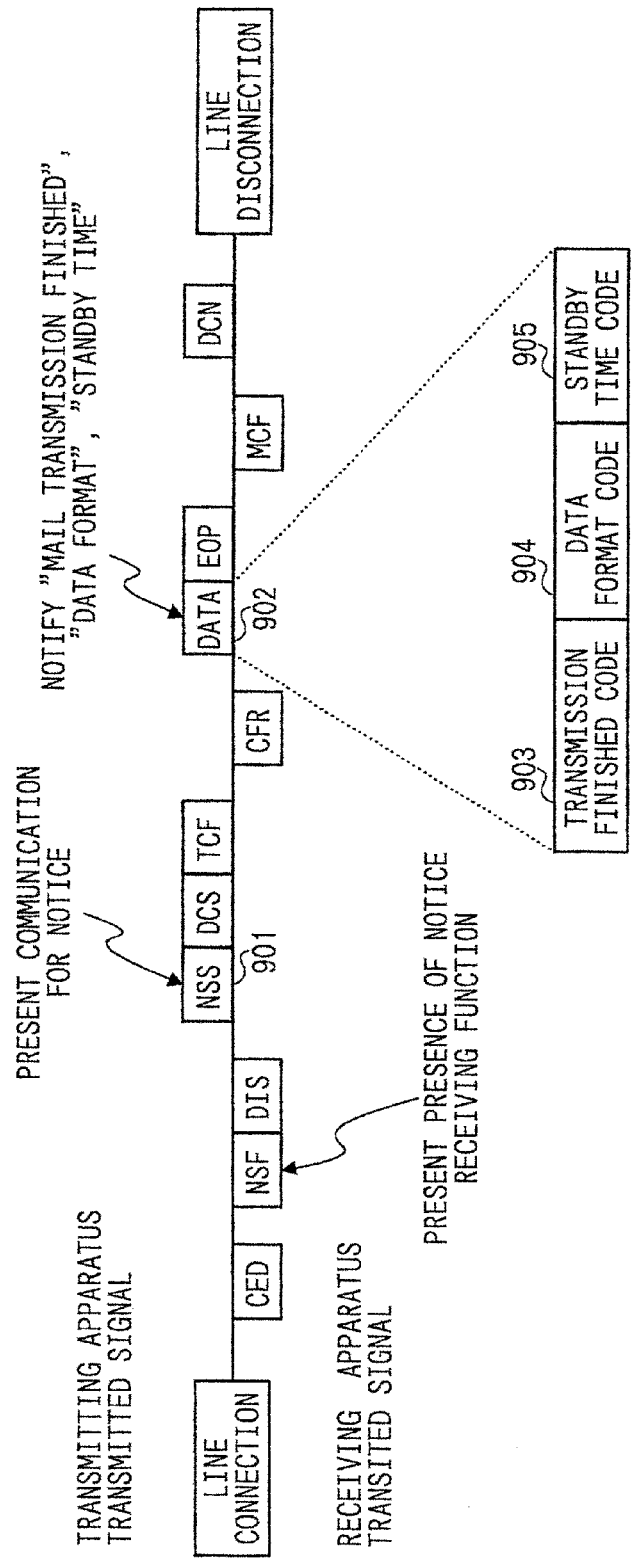
FIG. 9 is a view illustrating an example of nonstandard procedure including a notice of mail transmission according to the first embodiment.

Next, an explanation will be specifically given of the mail transmission notice in ST510 illustrated in FIG. 5. FIGS. 7 to 9 are views each illustrating an example of nonstandard procedure including a mail transmission notice according to the first embodiment.

The symbols used in FIGS. 7 to 9 means as follows:

CED: called station identification signal, NSF: nonstandard terminal function signal, DIS: digital identification signal, NSS: nonstandard function identification setting signal, DCS: digital signal command signal, TCF: training check, CFR: reception preparation confirming signal, DATA: notifying data, EOP: procedure ending signal, MCF: data confirming signal, and DCN: disconnection command.

In the example illustrated in FIG. 7, following on an NSS code 702, a transmission finished code 703 indicating that the mail transmission has finished, a data format code 704 indicative of a data format of transmission file, and a standby time code 705 indicative of standby time are sequentially inserted into a nonstandard function identification setting signal (NSS) 701 of phase B.

In the example illustrated in FIG. 8, following on an information field code 802, a transmission finished code 803, a data format code 804, and a standby time code 805 are sequentially inserted into an information field code 801 of phase B.

The examples explained so far include the respective information of mail transmit notice in the facsimile control signal in phase B, that is, pre-procedure, which is carried out before transmitting the message. The following example transmits a data signal including mail transmit notice in place of the image signal in phase C. Namely, as illustrated in FIG. 9, a code, which indicates that this communication is communication for mail transmit notice, is inserted in NSS 901. Then, a transmission finished code 903, a data format code 904, and a standby time code 905 are sequentially inserted into data signal 902.

This example shown in FIG. 9 is excellent in that information (for example, the number of originals, mail address of IFAX 1 on the transmitting end, and so on) since the respective information of mail transmission notice is presented as data.

The aforementioned first embodiment presents the following advantages.

First, the IFAX 1 on the transmitting end transmits e-mail to the IFAX 5 on the receiving end over the Internet, and then notifies the IFAX 5 that e-mail has been transmitted by facsimile communications. The IFAX 5 on the receiving end gains access to the ISP 4 on the receiving end by dial-up after this notice, and receives e-mail. Accordingly the IFAX 5 on the receiving end can prevent the unavailing mail check connection and to reduce the waste of access charge.

Secondly, the IFAX 1 on the transmitting end transmits e-mail to the IFAX 5 on the receiving end over the Internet. Thereafter, the IFAX 1 transmits sent data information of e-mail thereto by facsimile communications. The IFAX 5 on the receiving end determines whether send data included in e-mail is receivable from the sent data information or not. Then, only when it is receivable, the IFAX 5 gains access to the ISP 4 on the receiving end by dial-up, and receives e-mail. Accordingly, the IFAX 5 on the receiving end can prevent access by dial-up for unreceivable e-mail or e-mail, which is receivable but cannot be effectively handled, and to reduce the waste of access charge. Herein, the point whether or not send data is receivable does not means the point whether or not e-mail can be received from the ISP. That is, it means the point whether or not the content of received e-mail is printable by the printer 20 to inform the user of the content.

Thirdly, the IFAX 1 on the transmitting end transmits e-mail to the IFAX 5 on the receiving end over the Internet. Thereafter, the IFAX 1 transmits message receiving information instructing e-mail receiving time and timing thereto by facsimile communications. The IFAX 5 on the receiving end gains access to the ISP 4 on the receiving end by dial-up and receives e-mail in accordance with this message receiving information. Accordingly, the IFAX 5 on the receiving end can receive e-mail from the ISP 4 on the receiving end in accordance with the user's will of the IFAX 1 on the transmitting end. As a result, for example, after transmitting all e-mail messages from the IFAX 1 on the transmitting end, all e-mail is received by the IFAX 5 on the receiving end with one access by dial-up, so that the IFAX 5 can reduce the number of accesses by dial-up and reduce the waste of access charge.

Fourthly, the IFAX 1 on the transmitting end determines whether NSF sent from the receiving apparatus includes information indicative of "notice receiving function is present" or not. When this information is included therein, the IFAX 1 transmits the respective information of mail transmission notice in the facsimile control signal. While, when this information is not included therein, the IFAX 1 facsimile-transmits mail transmit notice thereto. If the receiving apparatus is the product, which is manufactured by other company and has no notice receiving function, or the receiving apparatus has a notice receiving function but the function is not active, the IFAX 1 can automatically notify the IFAX 5 that e-mail has been transmitted.

(Second Embodiment)

The first embodiment explained the case in which mail transmission notice was sent in the facsimile protocol (phases B, C). The second embodiment will explain a case in which a notice signal is transmitted in call setting (phase A) to send mail transmission notice.

Figure 10:
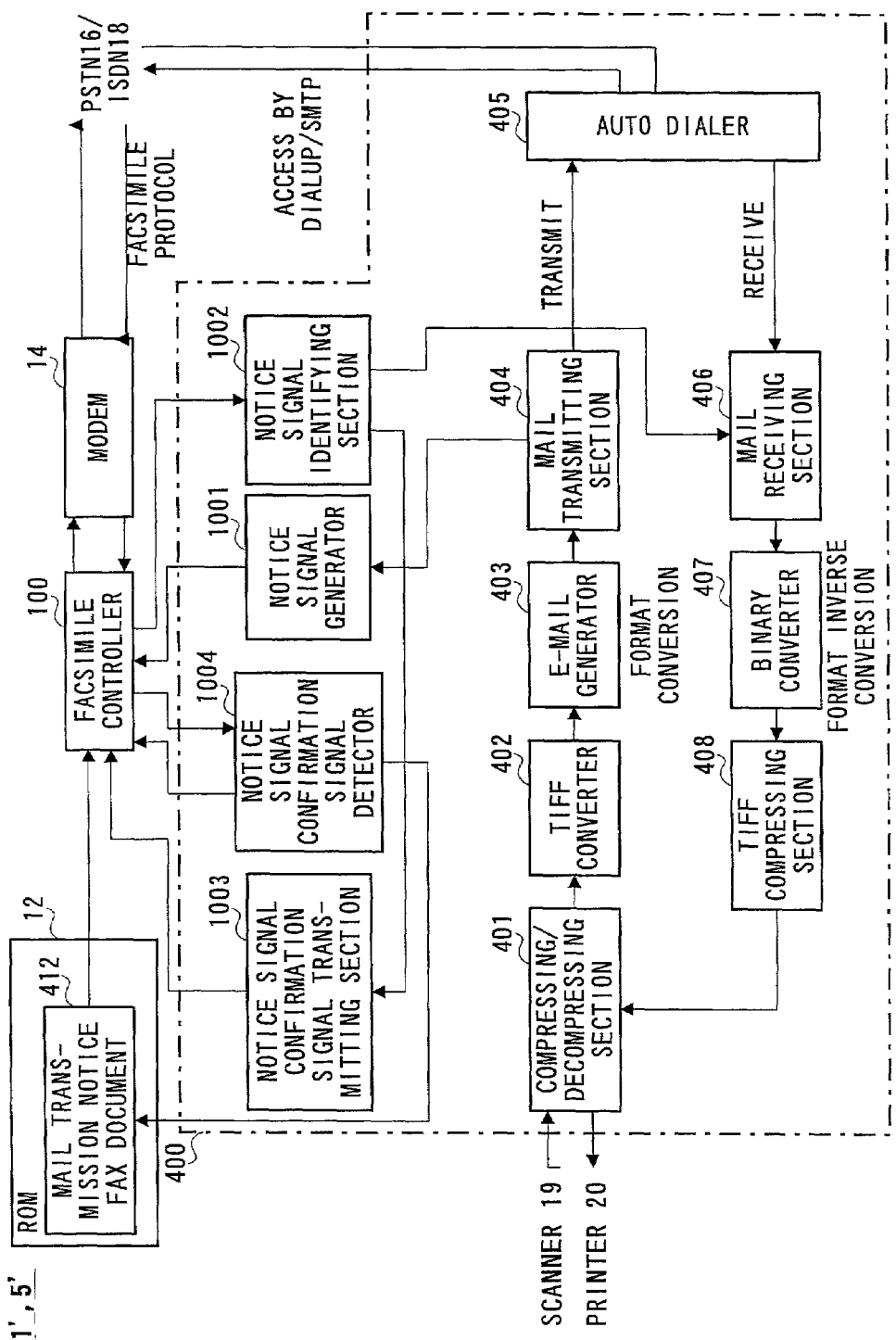
FIG. 10 is a block diagram illustrating an IFAX processor of the Internet facsimile apparatus relating to a second embodiment of the present invention.

FIG. 10 is a block diagram illustrating an IFAX processor of the Internet facsimile apparatus relating to the second embodiment of the present invention. The same reference numerals as FIG. 4 are added to the same configuration as the IFAXes 1 and 5 relating to the first embodiment, and the explanation is omitted.

In IFAXes 1' and 5' of the second embodiment, a notice signal generator 1001 generates a notice signal including the respective information of mail transmission notice, controls the facsimile controller 100, and transmits the notice signal to the communication partner in the phase A of the facsimile communications. This notice signal uses a signal frequency, which is not utilized in the normal facsimile communication protocol.

A notice signal identifying section 1002 identifies the notice signal transmitted from the communication partner, and controls the mail receiving section 406 in accordance with the identified result.

A notice signal confirmation signal transmitting section 1003 transmits a notice signal confirmation signal to the sender of the notice signal when the notice signal identifying section 1002 identifies the notice signal. This notice signal confirmation signal also uses a signal frequency, which is not utilized in the normal facsimile communication procedure. A notice signal confirmation signal detector 1004 detects the notice signal confirmation signal.

Figure 11:
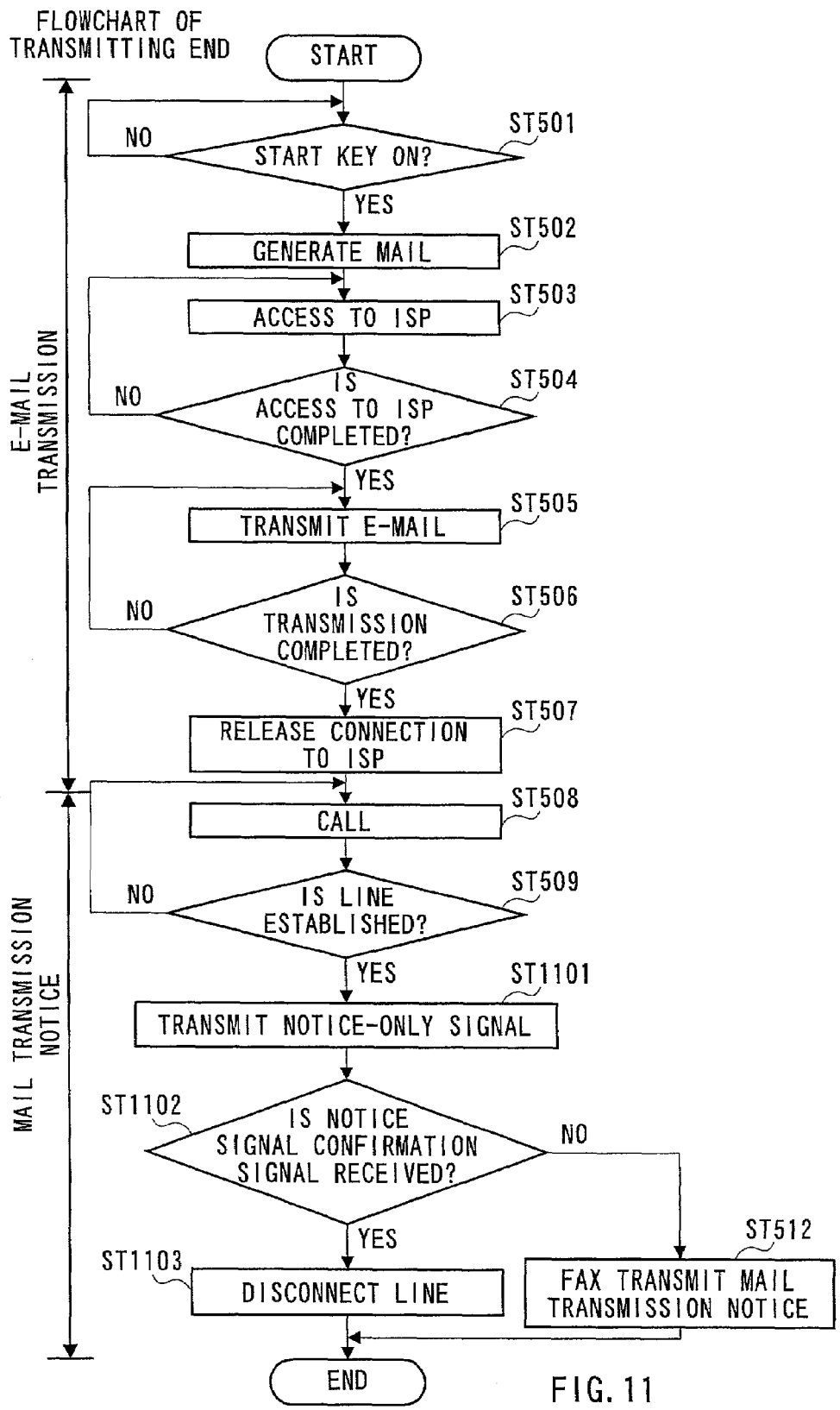
FIG. 11 is a flowchart illustrating an operation of the Internet facsimile apparatus on a transmitting end relating to the second embodiment of the present invention.
Figure 12:
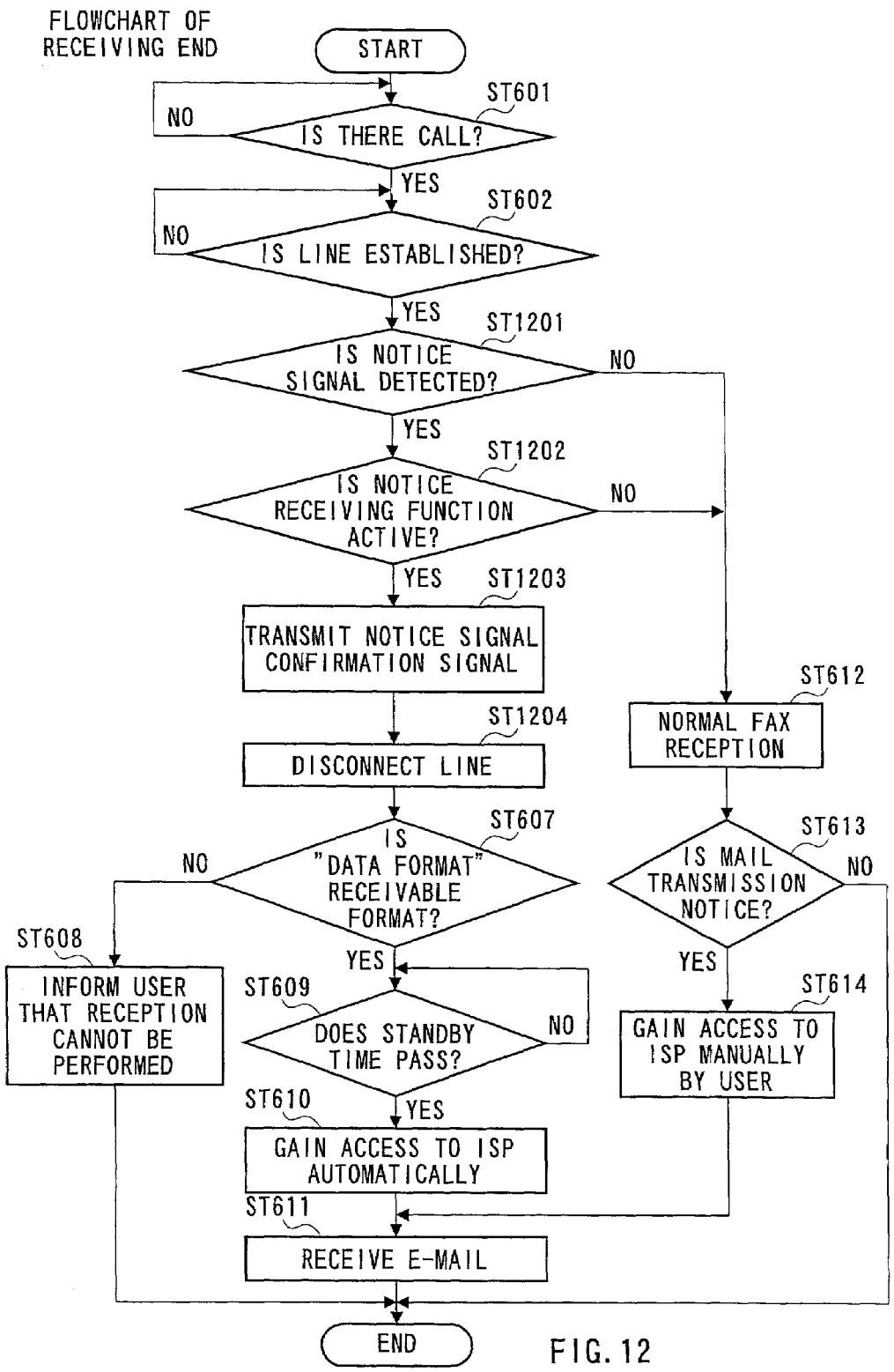
FIG. 12 is a flowchart showing an operation of the Internet facsimile apparatus on a receiving end relating to the second embodiment of the present invention.

FIG. 11 is a flowchart illustrating an operation of the Internet facsimile apparatus on the transmitting end relating to the second embodiment of the present invention. FIG. 12 is a flowchart showing an operation of the Internet facsimile apparatus on the receiving end relating to the second embodiment of the present invention. Regarding the same processing as the first embodiment, the same reference numerals as those of FIGS. 5 and 6 are added to FIGS. 11 and 12.

First, as illustrated in FIG. 11, the IFAX 1' on the transmitting end moves to processing of mail transmission notice after completing the e-mail transmission in ST501 to ST507. The facsimile controller 100 controls the modem 14 to close the telephone line and to call the facsimile number of the IFAX 5' on the receiving end (ST508). As illustrated in FIG. 12, when there is a call from the IFAX 1' on the transmitting end (ST601), the IFAX 5' on the receiving end waits for the establishment of line connection (ST602).

Backing to FIG. 11, when the line connection is not established in the IFAX 1' on the transmitting end (ST509), the notice signal generator 1001 generates the respective information of mail transmission notice, and transmits these signals, serving as notice signals, to the IFAX 5' on the receiving end in the phase A of the facsimile transmissions (ST1101). In the second embodiment, mail transmission finished notice information, data format of transmission file attached to e-mail as sent data information, and standby time as receiving information after sending mail transmission notice are included the notice signals. It is needless to say that the present invention is not limited to the above.

As illustrated in FIG. 12, when the notice signal identifying section 1002 of the IFAX 5' in the receiving end detects the notice signal (ST1201) the IFAX 5' determines whether the notice receiving function is active or not (ST1202). When the notice receiving function is active, the notice signal identifying section 1002 commands the notice signal confirmation signal transmitting section 1003 to return the notice signal confirmation signal to the IFAX 1' on the transmitting end (ST1203). After that, the notice signal identifying section 1002 opens the line (ST1204). When there is no notice receiving function, the notice signal identifying section 1002 causes the facsimile controller 100 to execute the normal facsimile communications (ST612).

The notice signal identifying section 1002 determines whether or not the data format of the transmission file attached to e-mail is one that is receivable by the IFAX 5' on the transmitting end based on sent data information included in the notice signal (ST607). When the data format is not one that is receivable by the IFAX 5', the notice signal identifying section 1002 informs the user that e-mail is unreceivable by use of, for example, a display and the like provided in the panel controller 21 (ST608), and ends processing without accessing by dial-up.

On the other hand, when the data format of transmission file is one that is receivable by the IFAX 5', the notice signal identifying section 1002 measures standby time specified by the transmitting end by use of the timer 22 based on the mail transmission notice (ST609). When the standby time passes, the mail receiving section 406 causes the auto dialer 405 to automatically perform connection to the ISP 4 on the receiving end (ST610). After the completion of the connection, the mail receiving section 406 receives e-mail from the mail server of ISP 4 on the receiving end (ST611). Thereafter, the content of e-mail including image information is printed by the printer 20.

When the IFAX 5' determines that the notice receiving function is not active in ST1202, no notice signal confirmation signal is transmitted. For this reason, the notice signal confirmation signal detector 1004 determines whether the notice signal confirmation signal has been returned or not in ST1102 of FIG. 11. When the notice signal confirmation signal has been returned, the notice signal confirmation signal detector 1004 opens the line (ST1103). While, when the notice signal confirmation signal has not been returned, the notice signal confirmation signal detector 1004 transmits the mail transmission notice as an image signal (ST512).

When the notice signal identifying section 1002 detects no notice signal in the notice signal in ST1201 illustrated in FIG. 12 and the IFAX 5' determines that the notice receiving function is not active in ST1202, the IFAX 5' performs the normal facsimile reception (ST612). When whether or not the FAX document received here is the mail transmission notice is determined (ST613) and it is the mail transmission notice, the mail receiving section 406 causes the auto dialer 405 to perform connection to the ISP 4 on the receiving end (ST614) in accordance with the instruction of e-mail manual reception by the user. After the completion of connection, the mail receiving section 406 receives e-mail from the mail server of the ISP 4 on the receiving end (ST611). Thereafter, the content of e-mail including image information is printed by the printer 20.

According to the second embodiment, in addition to the same advantage as the first embodiment, there can be obtained an advantage in which communication time required for mail transmission notice may be short since the mail transmission notice is sent using the dedicated notice signal in the phase A. Namely, this provides an advantage that improves the reduction in communication charge.

(Third Embodiment)

The third embodiment will explain a case in which the notice signal is transmitted to a transmission terminal identification signal to send mail transmission notice.

Figure 13:
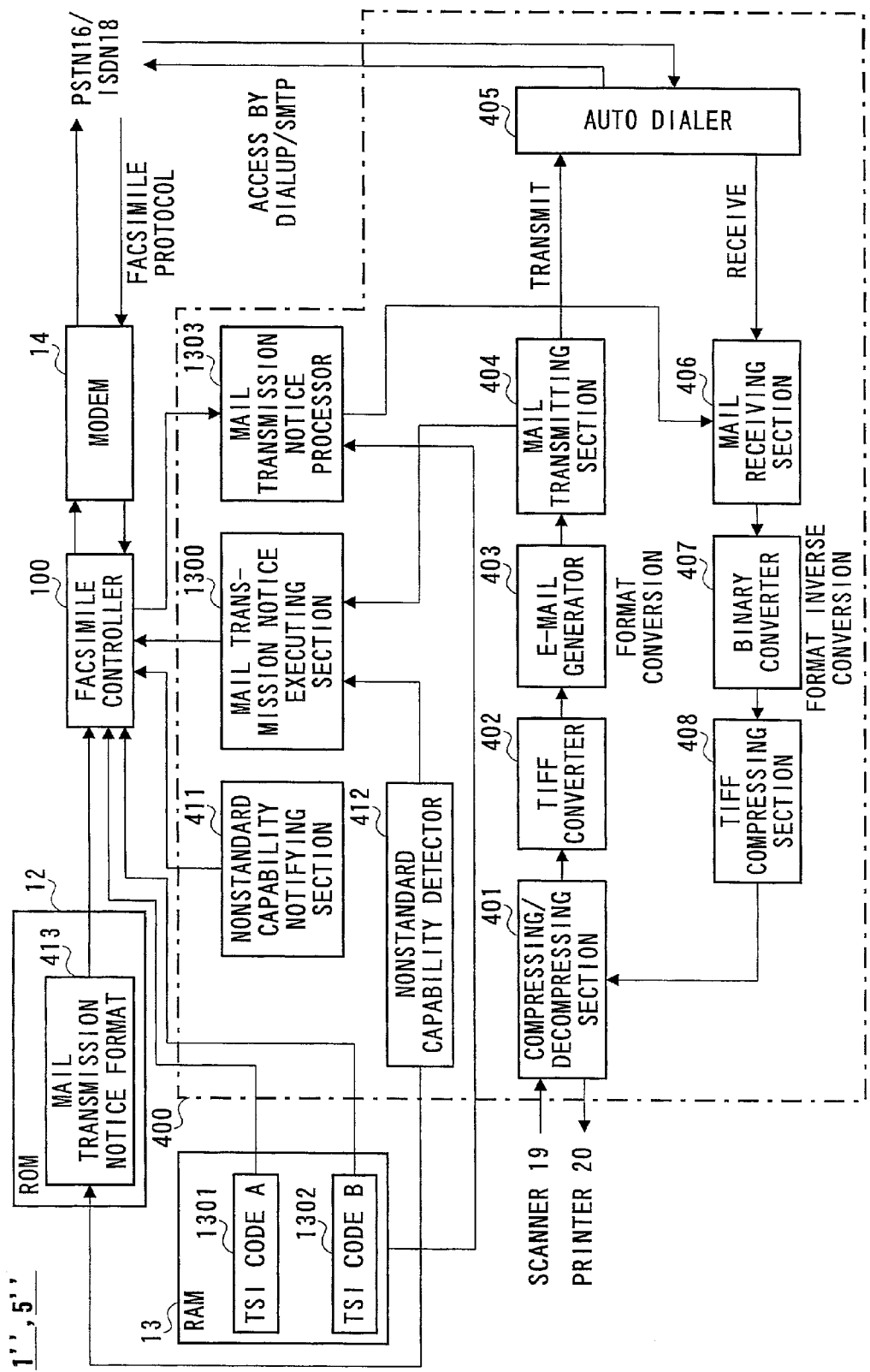
FIG. 13 is a block diagram illustrating an IFAX processor of the Internet facsimile apparatus relating to a third embodiment of the present invention.

FIG. 13 is a block diagram illustrating an IFAX processor of the Internet facsimile apparatus relating to the third embodiment of the present invention. IFAXes 1" and 5" on the transmitting and receiving ends relating to the third embodiment have partially the same configuration as those of IFAXes 1 and 5 relating to the first embodiment in view of hardware and software and the same reference numerals as those of FIG. 4 are added to the same configuration, and the explanation is omitted.

A mail transmission notice executing section 1300 instructs the facsimile controller 100 to transmit the telephone number of the apparatus preregistered from the transmitting end at TSI of the normal facsimile protocol. According to the third embodiment, the telephone number of the apparatus is registered in the RAM 13 as TSI code A 1301 and a predetermined number (for example, 0001) other than the telephone number of this apparatus is preregistered in the RAM 13 as a TSI code B 1302. When the mail transmission notifying section 1300 detects the mail transmission, the facsimile controller 100 of the IFAX 1" on the transmitting end transmits the TSI code B 1302 indicative of e-mail transmission in place of the normal TSI code A 1301 at the time of transmitting the TSI signal in the phase B.

While, the facsimile controller 100 of the IFAX 5" on the receiving end identifies the TSI code and notifies the mail transmission notice processor 1303 of the result. The mail transmission notice processor 1303 compares the received TSI code with the TSI code B1302 stored in the RAM 13 of the apparatus. When both are matched each other, the mail transmission notice processor 1303 determines that e-mail has been transmitted from the IFAX 1" on the transmitting end, and instructs the mail receiving section 406 to receive e-mail.

Figure 14:
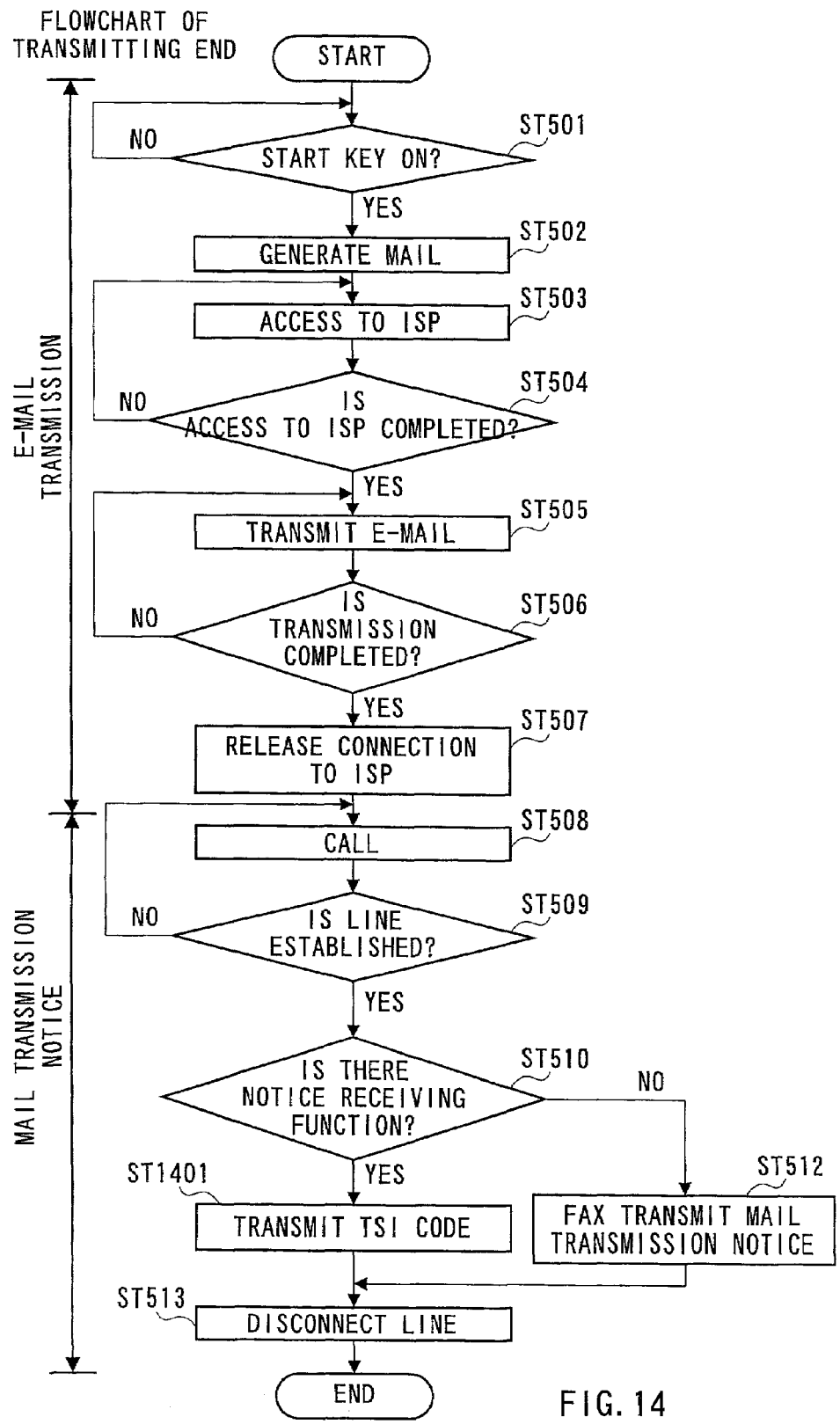
FIG. 14 is a flowchart illustrating an operation of the Internet facsimile apparatus on a transmitting end relating to the third embodiment of the present invention.
Figure 15:
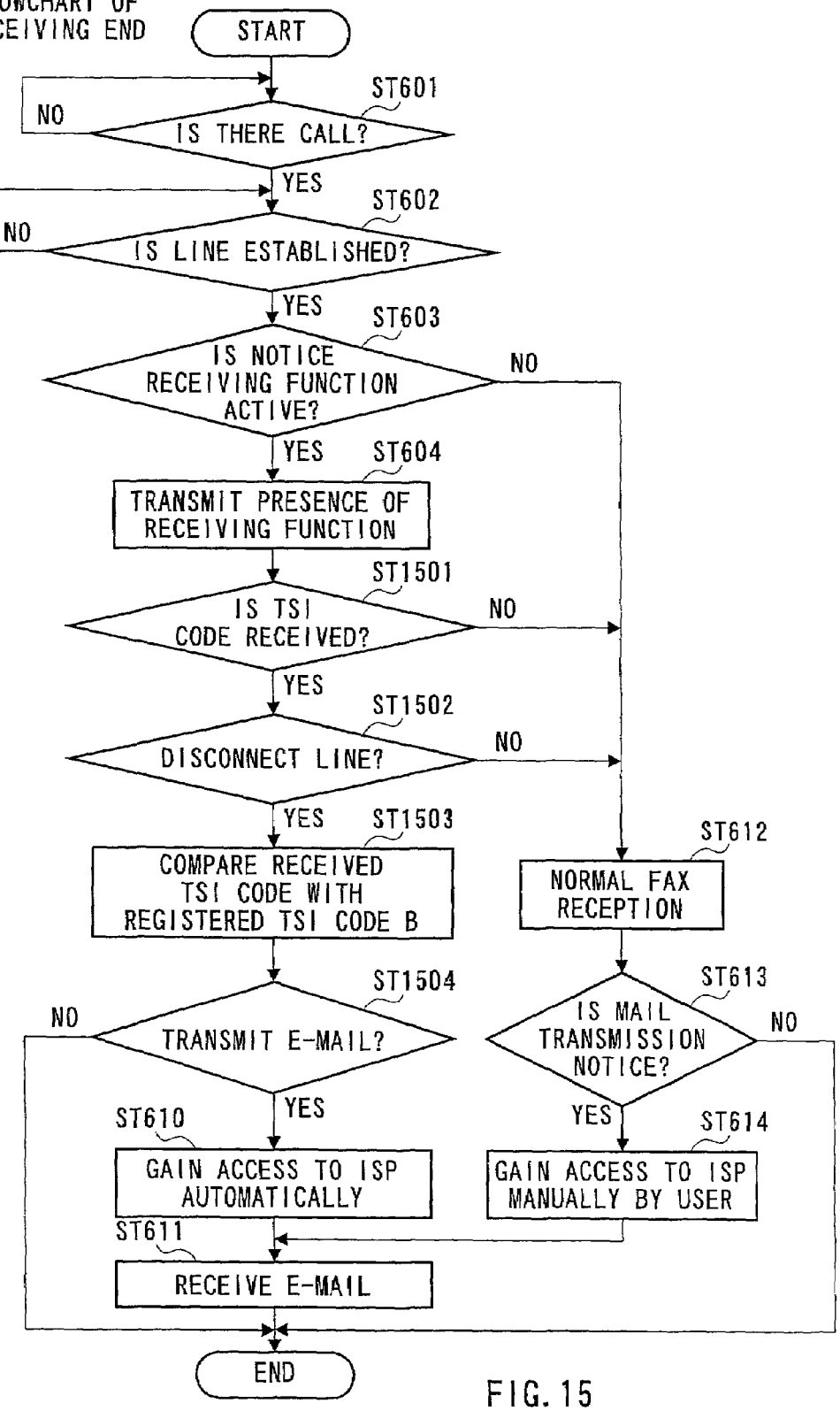
FIG. 15 is a flowchart showing an operation of the Internet facsimile apparatus on a receiving end relating to the third embodiment of the present invention.

FIG. 14 is a flowchart illustrating an operation of the Internet facsimile apparatus on the transmitting end relating to the third embodiment of the present invention. FIG. 15 is a flowchart showing an operation of the Internet facsimile apparatus on the receiving end relating to the third embodiment of the present invention. In FIGS. 14 and 15, the same reference numerals as those of FIGS. 5 and 6 are added to the same processing as that of the first embodiment.

First, as illustrated in FIG. 14, after completing the e-mail transmission in ST501 to ST507, the IFAX 1" on the transmitting end begins to process of mail transmission notice. First, the facsimile controller 100 controls the modem 14 to close the telephone line and to call the facsimile number of the IFAX 5" on the receiving end (ST508). As illustrated in FIG. 15, when there is a call from the IFAX 1" on the transmitting end (ST601), the IFAX 5" on the receiving end waits for the establishment of line connection (ST602). When the telephone line is established, the nonstandard capability notifying section 411 determines whether the apparatus has the notice receiving function or not (ST603). When the apparatus has the notice receiving function, the nonstandard capability notifying section 411 transmits NSF indicative of "notice receiving function is present" to the IFAX 5" on the transmitting end (ST604).

Backing to FIG. 14, in the IFAX 1" on the transmitting end, after establishing the line connection (ST509), the nonstandard capability detector 412 determines whether or not information of "notice receiving function is present" is included inNSF (ST510). When information of "notice receiving function is present" is included in NSF, the mail transmission notice executing section 1300 instructs the facsimile controller 100 to transmit TIS code B 1302 with TIS of the facsimile protocol (phase B) (ST1401). While, when information of "notice receiving function is present" is not included in NSF, the mail transmission notice executing section 1300 transmits the mail transmission notice as an image signal (ST512). After sending the mail transmission notice using the facsimile control signal or the image signal, the IFAX 1" on the transmitting end opens the IFAX 5" on the receiving end from the line (ST513).

In the IFAX 5" on the receiving end, as illustrated in FIG. 15, the mail transmission notice executing section 1300 receives the TIS code received by the facsimile controller 100 from the transmitting end (ST1501). After that, the transmitting end opens the line when the TIS code indicates communications for the purpose of transmission notice. Contrarily, when it is not communications for the purpose of transmission notice, normal FAX reception is performed (ST612). Then, the IFAX 5" on the receiving end determines whether the line is disconnected or not (ST1502). When the line is connected, the operation goes to ST1503, and when it is not connected, the operation goes to ST612.

In ST1503, the mail transmission notice processor 1303 compares this TSI code with the TSI code B 1302 registered in the RAM 13. In ST1504, when both match each other, the mail transmission notice processor 1303 determines that this is e-mail transmission. When both do not match each other, the mail transmission notice processor 1303 determines that this is not e-mail transmission.

In the case of e-mail transmission, the mail receiving section 406 causes the auto dialer 405 to automatically perform connection to the ISP 4 on the receiving end (ST610). After the completion of the connection, the mail receiving section 406 receives e-mail from the mail server of ISP 4 on the receiving end (ST611). Thereafter, the content of e-mail including image information is printed by the printer 20.

In ST1504, the mail transmission notice processor 1303 determines that this is not e-mail transmission, processing is ended directly.

When the IFAX 5" on the receiving end does not receive the TSI code in ST1502, there is high possibility that the transmitting end will perform normal facsimile communication. For this reason, the IFAX 5" performs the normal facsimile reception (ST612).

When the IFAX 5" on the receiving end receives the TSI code in ST1502 but the IFAX 1" on the transmitting end does not disconnect the line, image information is transmitted from the transmitting end in accordance with the normal facsimile protocol later. For this reason, the IFAX 5" performs the normal facsimile reception (ST612).

After ST612, the IFAX 5" determines whether the FAX document received here is the mail transmission notice or not (ST613). When it is the mail transmission notice, the mail receiving section 406 causes the auto dialer 405 to perform connection to the ISP 4 on the receiving end (ST614). After the completion of connection, the mail receiving section 406 receives e-mail from the mail server of the ISP 4 on the receiving end (ST611). Thereafter, the content of e-mail including image information is printed by the printer 20.

According to the third embodiment, the mail transmission notice is performed using the dedicated number other than the telephone number of the predetermined apparatus, namely TSI code B 1302. As a result, the dedicated number functions as a password to increase confidentiality. There is a case in which only transmission notice is sent to the IFAX of transmission destination different from the original transmission destination because of erroneous telephone number. In this case, the third embodiment of the present invention provides an advantage in which the use of dedicated number prevents the IFAX on the receiving end from performing wasteful mail check connection based on the erroneous transmission notice.

Figure 16:
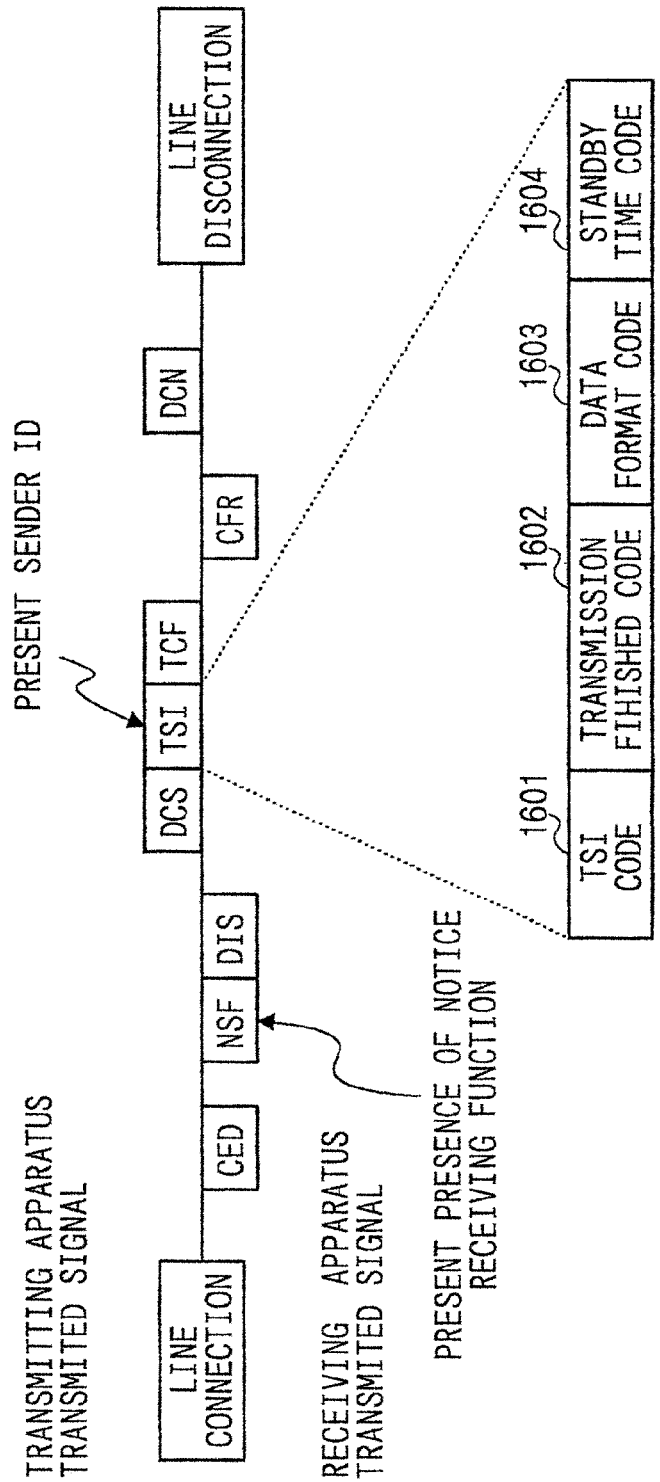
FIG. 16 is a view illustrating an example of nonstandard procedure including a notice of mail transmission according to the third embodiment.

In the third embodiment, only the dedicated TSI code 1302 is transmitted to the receiving end from the transmitting end at the time of mail transmission notice. However, as illustrated in FIG. 16, in addition to a TSI code 1601, a transmission finished code 1602, a data format code 1603, and a standby time code 1604 may be included in TSI and transmitted similar to the first and second embodiments. Whereby, the third embodiment also provides the same advantage as that of the first and second embodiments When the other user prepares for transmit the original, e.g., the operation of setting the original on the original setting table, etc., while the IFAX 1" on the transmitting end is connecting to the ISP, the transmission being prepared is kept waiting. Conversely, in the case of taking priority over other user's transmission, the IFAX 1" on the transmitting end may store mail transmission notice processing as transmission reservation information.

(Fourth Embodiment)

The fourth embodiment explains a case in which mail transmission notice is performed using a caller ID (sender number notice) from the exchange on the public switched telephone network (PSTN).

Figure 17:
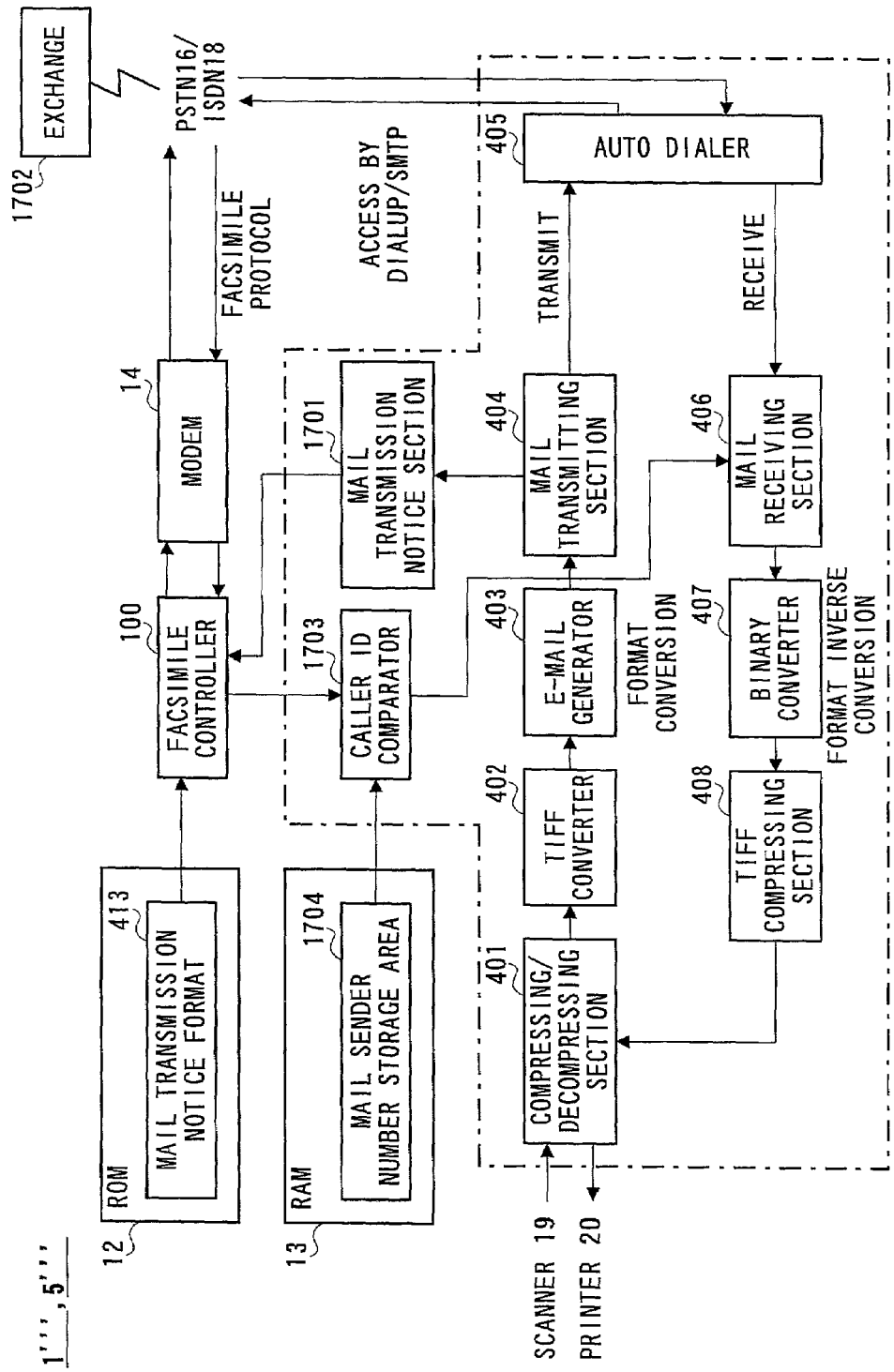
FIG. 17 is a block diagram illustrating an IFAX processor of the Internet facsimile apparatus relating to a fourth embodiment of the present invention.

FIG. 17 is a block diagram illustrating an IFAX processor of the Internet facsimile apparatus relating to the fourth embodiment of the present invention. IFAXes 1''' and 5''' on the transmitting and receiving ends relating to the fourth embodiment have partially the same configuration as those of IFAXes 1 and 5 relating to the first embodiment in view of hardware and software and the same reference numerals as those of FIG. 4 are added to the same configuration, and the explanation is omitted.

In the IFAX 1''' relating to the fourth embodiment, a mail transmission notifying section 1701 causes the facsimile controller 100 to originate a call to the IFAX 5''' on the receiving end when detecting that the mail transmitting section 404 has transmitted e-mail to IFAX 5''' on the receiving end. An exchange 1702 on PSTN 16 performs mail transmission notice to the IFAX 5''' in response to this call. In performing mail transmission notice, the facsimile controller 100 is designed to stop the call at the time when detecting a ring back tone from the exchange 1702.

On the other hand, the modem 14 of the IFAX 5''' on the receiving end receives a caller ID from the exchange 1702 based on ITU-V23 defined by the International Telecommunication Union (ITU) and recognizes the sender telephone number.

A caller ID comparator 1703 compares at least one telephone number prestored in a mail sender number storage area 1704 of the RAM 13 with the recognized sender telephone number. When both match each other, the caller ID comparator 1703 determines that e-mail has been transmitted from the sender. Then, the caller ID comparator 1703 instructs the mail receiving section 406 to receive e-mail.

Figure 18:
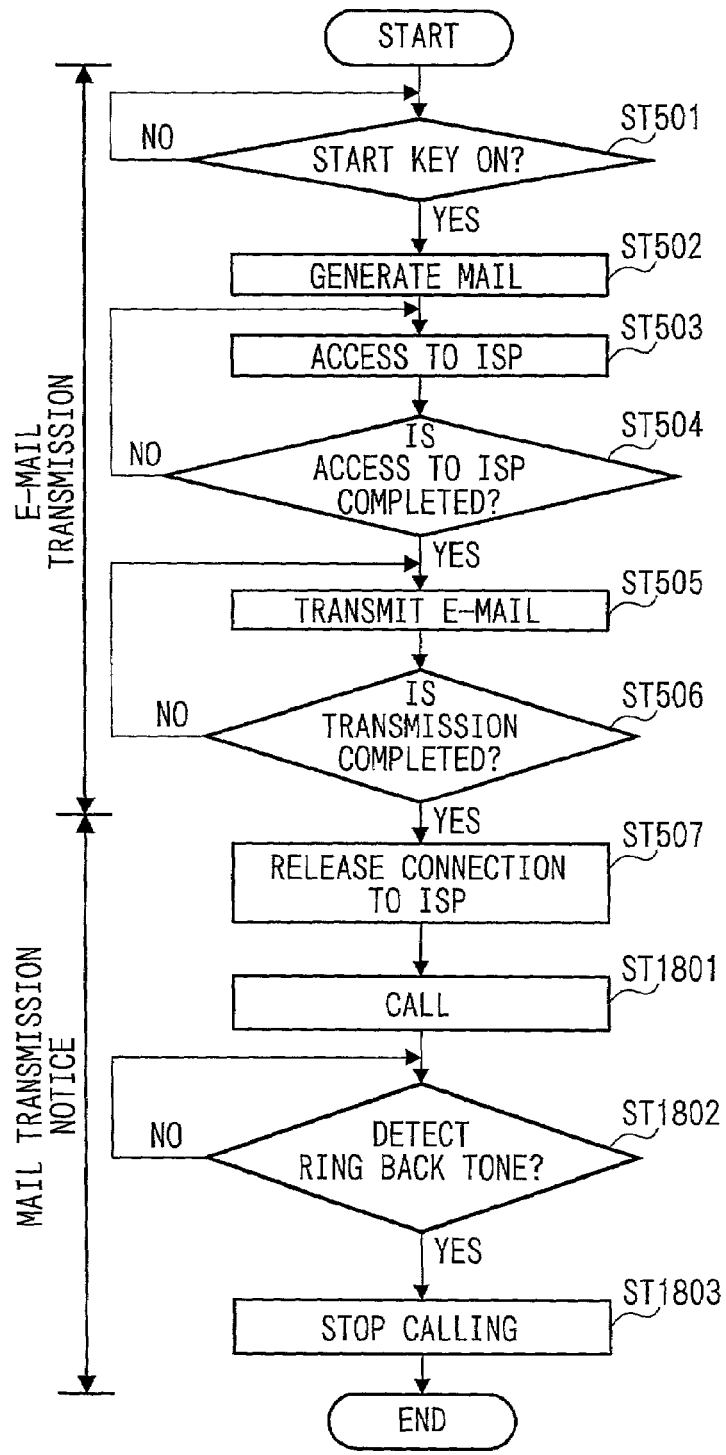
FIG. 18 is a flowchart illustrating an operation of the Internet facsimile apparatus on a transmitting end relating to the fourth embodiment of the present invention.
Figure 19:
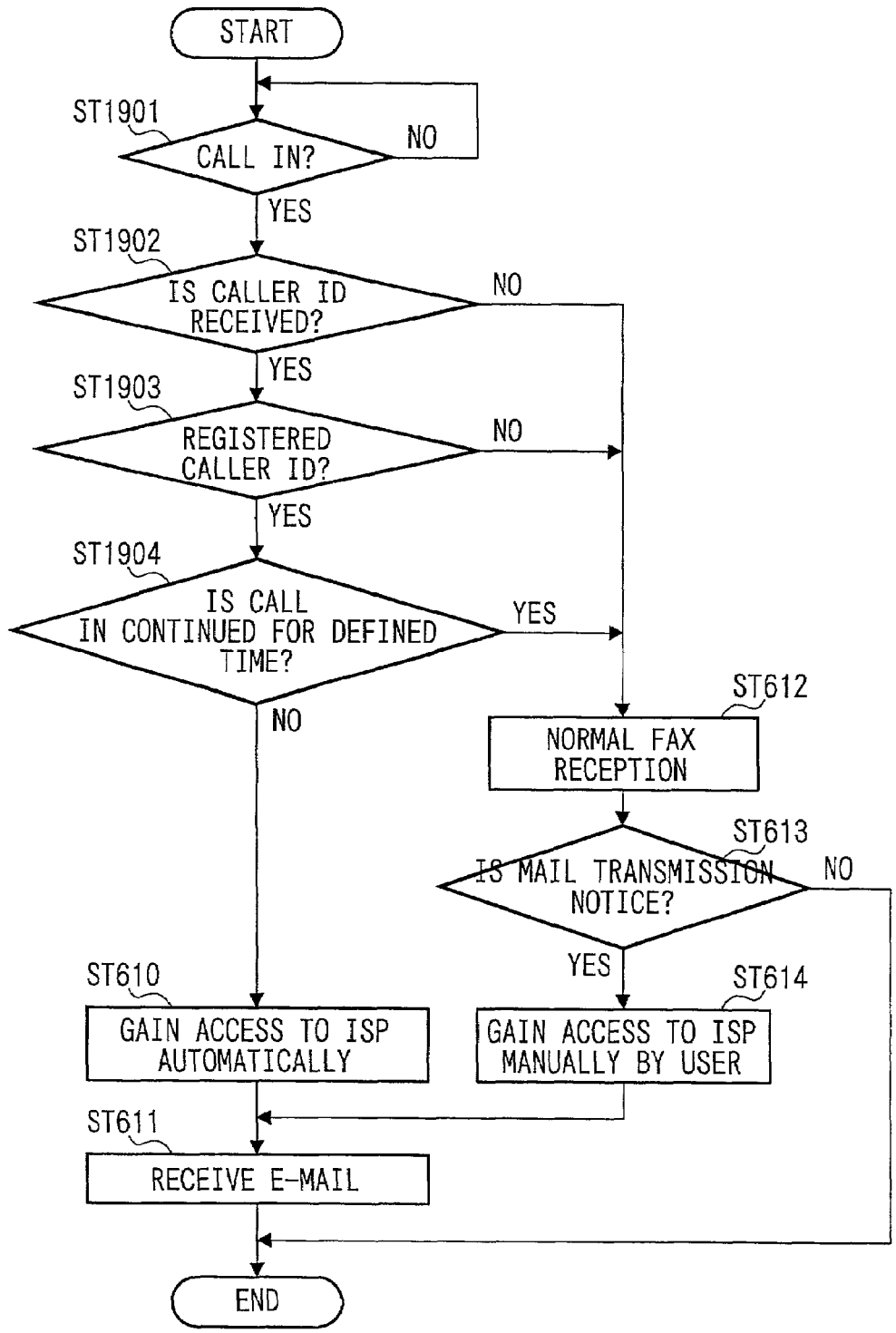
FIG. 19 is a flowchart showing an operation of the Internet facsimile apparatus on a receiving end relating to the fourth embodiment of the present invention.

FIG. 18 is a flowchart illustrating an operation of the Internet facsimile apparatus on the transmitting end relating to the fourth embodiment. FIG. 19 is a flowchart showing an operation of the Internet facsimile apparatus on the receiving end relating to the fourth embodiment of the present invention. Regarding the same processing as the first embodiment, the same reference numerals as those of FIGS. 5 and 6 are added to FIGS. 18 and 19.

First, as illustrated in FIG. 18, the IFAX 1''' on the transmitting end moves to processing of mail transmission notice after completing the e-mail transmission in ST501 to ST507. The facsimile controller 100 controls the modem 14 to close the telephone line and to call the facsimile number of the IFAX 5''' on the receiving end (ST1801). The exchange 1702 transmits a caller ID incoming signal (CAR signal) to the IFAX 5''' on the receiving end in response to this call.

As illustrated in FIG. 19, the IFAX 5''' on the receiving end is waiting for call in (ST1091). More specifically, the IFAX 5''' on the receiving end monitors the presence or absence of the CAR signal from the exchange 1702. When detecting the CAR signal, the IFAX 5''' on the receiving end closes the line. Next, the modem 14 serving as a V23RX controller receives the caller ID transmitted by the exchange 1702 by a predetermined procedure. Thus, the IFAX 5''' on the receiving end executes a first response of sender number notice in cooperation with the exchange 1702. Thereafter, the modem 14 recognizes the sender telephone number from the caller ID, and sends it to the facsimile controller 100. The facsimile controller 100 sends the sender telephone number to the caller ID comparator 1703 of the IFAX controller 400. This ring back tone is returned to the IFAX 1''' on the transmitting end while the exchange 1702 is calling the IFAX 5''' on the receiving end. When the exchange 1702 cannot call the IFAX 5''' since it is on the busy line, this ring back tone is returned thereto.

After that, when the reception of caller ID, that is, sender number notice is performed in ST1902, the caller ID comparator 1703 compares the sender telephone number and the telephone number registered in a mail sender number storage area 1704 to determined whether or not the sender telephone number has been registered in the mail sender number storage area 1704 (ST1903).

Next, when the sender telephone number has been registered therein, the caller ID comparator 1703 determines whether the call in has been continued for a defined time or not (ST1904). This is performed to check whether the call in is mail transmission notice or FAX transmission. If it is No in ST1904, the caller ID comparator 1803 instructs the mail receiving section 406 to receive e-mail. The e-mail receiving section 406 causes the auto dialer 405 to automatically perform connection to the ISP 4 on the receiving end (ST610). After the completion of the connection, the mail receiving section 406 receives e-mail from the mail server of ISP 4 on the receiving end (ST611). Thereafter, the content of e-mail including image information is printed by the printer 20.

When the reception of caller ID is not performed in ST1902, the IFAX 5''' on the receiving end determines that the transmitting end wishes FAX transmission, namely, this is not mail communication, and performs normal facsimile reception (ST612).

When the sender telephone number has not been registered in the mail sender number storage area 1704 in ST1903, the IFAX 5''' on the receiving end performs normal facsimile reception (ST612) since image information is transmitted from the transmitting end in accordance with the normal facsimile protocol later.

When the call in has been continued for a defined time in ST1904, the IFAX 5''' on the receiving end determines that the transmitting end wishes FAX transmission, namely, this is not mail communication, and performs normal facsimile reception (ST612).

After ST612, when whether or not the FAX document received here is the mail transmission notice is determined (ST613) and it is the mail transmission notice, the mail receiving section 406 causes the auto dialer 405 to perform connection to the ISP 4 on the receiving end (ST614) in accordance with the instruction of e-mail manual reception by the user. After the completion of connection, the mail receiving section 406 receives e-mail from the mail server of the ISP 4 on the receiving end (ST611). Thereafter, the content of e-mail including image information is printed by the printer 20.

According to the fourth embodiment, since the IFAX 1''' on the transmitting side can carry out the mail transmission notice using sender number notice service, the IFAX 1''' on the transmitting side stops the calling when detecting the ring back tone from the exchange 1702. In other words, since the mail transmission notice can be carried out by the calling, the mail transmission notice can be completed before communication charge occurs. This provides an advantage in which the communication charge of PSTN is prevented from being required for only the mail transmission notice to further reduce the communication cost.

The first to fourth embodiments explained the case in which the mail transmission notice was performed on PSTN 16 using the modem 14. It is needless to say that the mail transmission notice may be performed on ISDN 18 using the digital communication circuit 17.

Moreover, in the first to fifth embodiments, the IFAXes 1, 1', 1", 1''' are connected to the Internet by access by dial-up. However, they may be connected to the Internet via LAN or continuous connection. In this case, it is possible to obtain the effect that improves the access by dial-up at the IFAX on the receiving end similarly.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may be also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMS, and magneto-optical disks, ROMS, RAMS, EPROMs, EEPROMS, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

The present invention is not limited to the above described embodiments, and various variations and modifications may be possible without departing from the scope of the present invention.

This application is based on the Japanese Patent Application No.2000-100998 filed on Apr. 3, 2000, entire content of which is expressly incorporated by reference herein.

What is claimed is:

1. A transmitting Internet facsimile apparatus transmitting data to a receiving Internet facsimile apparatus via a telephone network and being connected to the Internet, the receiving Internet facsimile apparatus being connected to a mail server via the Internet, the mail server storing an e-mail directed to the receiving Internet facsimile apparatus, the receiving Internet facsimile apparatus accessing the mail server to obtain the e-mail directed to the receiving Internet facsimile apparatus, the transmitting Internet facsimile apparatus comprising:

a controller configured to transmit, to the mail server via the Internet, the e-mail directed to the receiving Internet facsimile apparatus, the controller being further configured to transmit a predetermined notice to the receiving Internet facsimile apparatus via the telephone network, the predetermined notice indicating that the transmitting Internet facsimile apparatus has transmitted the e-mail directed to the receiving Internet facsimile apparatus, the predetermined notice further including information regarding a time period that the e-mail is obtainable from the mail server.

2. The transmitting Internet facsimile apparatus according to claim 1, wherein the information regarding the time period that the e-mail is obtainable from the mail server comprises one of a time designated for obtaining the e-mail from the mail server, a time interval between a transmission of the predetermined notice and a time that the e-mail is obtainable from the mail server, or an indication that the e-mail should be obtained from the mail server after the predetermined notice of the last e-mail is received, when a plurality of e-mails are transmitted for a plurality of documents.

3. A receiving Internet facsimile apparatus connected to a mail server via the Internet and receiving data from a transmitting Internet facsimile apparatus via a telephone network, the transmitting Internet facsimile apparatus transmitting, to the mail server via the Internet, an e-mail directed to the receiving Internet facsimile apparatus, the receiving Internet facsimile apparatus comprising:

a receiver configured to receive a predetermined notice from the transmitting Internet facsimile apparatus via a telephone work, the predetermined notice indicating that the transmitting Internet facsimile apparatus has transmitted, to the mail server via the Internet, the e-mail directed to the receiving Internet facsimile apparatus, the predetermined notice further including information regarding a time period that the e-mail is obtainable from the mail server; and a controller configured to access the mail server and to obtain the e-mail from the mail server, based on the information regarding the time period included in the predetermined notice, when the predetermined notice is received from the transmitting Internet facsimile apparatus.

4. The receiving Internet facsimile apparatus according to claim 3, wherein the controller accesses the mail server, when it is determined that the receiving Internet facsimile apparatus can receive the e-mail, based on the information regarding the time period included in the predetermined notice.

5. An Internet facsimile communication method for transmitting an e-mail directed to a receiving Internet facsimile apparatus, the receiving Internet facsimile apparatus being connected to a mail server via the Internet, the mail server storing an e-mail directed to the receiving Internet facsimile apparatus, the receiving Internet facsimile apparatus accessing the mail server to obtain the e-mail directed to the receiving Internet facsimile apparatus, the Internet facsimile communication method comprising:

transmitting, to the mail server via the Internet, the e-mail directed to the receiving Internet facsimile apparatus;

transmitting a predetermined notice to the receiving Internet facsimile apparatus via a telephone network, the predetermined notice indicating a notice that the e-mail has been transmitted to the receiving Internet facsimile apparatus, the predetermined notice further including information regarding a time period that the e-mail is obtainable from the mail server.

6. An Internet facsimile communication method for receiving an e-mail directed to a receiving Internet facsimile apparatus from a transmitting Internet facsimile apparatus, the transmitting Internet facsimile apparatus transmitting, to a mail server via the Internet, the e-mail directed to the receiving Internet facsimile apparatus, the Internet facsimile communication method comprising:

receiving a predetermined notice from the transmitting Internet facsimile apparatus via a telephone work, the predetermined notice indicating that the transmitting Internet facsimile apparatus has transmitted, to the mail server via the Internet, the e-mail directed to the mail server, the predetermined notice further including information regarding a time period that the e-mail is obtainable from the mail server; and accessing the mail server to obtain the e-mail, based on the information regarding the time period included in the predetermined notice, when the predetermined notice is received from the transmitting Internet facsimile apparatus.

* * * * *